(12) United States Patent
Zha

(10) Patent No.: US 11,111,025 B2
(45) Date of Patent: Sep. 7, 2021

(54) FLUID SYSTEMS THAT PREVENT THE FORMATION OF ICE

(71) Applicant: COFLOW JET, LLC, Cutler Bay, FL (US)

(72) Inventor: Gecheng Zha, Cutler Bay, FL (US)

(73) Assignee: COFLOW JET, LLC, Cutler Bay, FL (US)

( * ) Notice: Subject to any disclaimer, the term of this patent is extended or adjusted under 35 U.S.C. 154(b) by 191 days.

(21) Appl. No.: 16/445,822

(22) Filed: Jun. 19, 2019

(65) Prior Publication Data

US 2019/0389588 A1 Dec. 26, 2019

Related U.S. Application Data

(60) Provisional application No. 62/688,479, filed on Jun. 22, 2018.

(51) Int. Cl.
*B64D 15/04* (2006.01)
*B64C 3/14* (2006.01)
(Continued)

(52) U.S. Cl.
CPC .............. *B64D 15/04* (2013.01); *B64C 3/141* (2013.01); *B64C 3/26* (2013.01); *B64D 15/12* (2013.01);
(Continued)

(58) Field of Classification Search
CPC .................... B64D 15/04; B64D 15/12; B64D 2033/0233; B64C 3/141; B64C 3/26; B64C 2003/143; H05B 2214/02
See application file for complete search history.

(56) References Cited

U.S. PATENT DOCUMENTS

| 1,580,577 A | 4/1926 | Baumann |
| 1,714,608 A | 5/1929 | Massey |

(Continued)

FOREIGN PATENT DOCUMENTS

| CN | 104176241 | 12/2014 |
| CN | 104149967 | 5/2015 |

(Continued)

OTHER PUBLICATIONS

World Intellectual Property Organization, English Translation of CN 104149967, retrieved from Internet Oct. 4, 2019, pp. 1-4.
(Continued)

*Primary Examiner* — Rodney A Bonnette
(74) *Attorney, Agent, or Firm* — MacMillan, Sobanski & Todd, LLC

(57) ABSTRACT

Fluid systems are described herein. An example fluid system includes a main body and a heating member attached to the main body. The main body has a leading edge, a trailing edge, an injection opening, a suction opening, a channel, a first passageway, a second passageway, a first opening, a second opening, and a third opening. The channel extends from the injection opening to the suction opening. The first passageway extends from the first opening to the second opening. The first opening is in communication with the channel and the second opening is in communication with the second passageway. The second passageway is in communication with the first passageway and extends to the third opening, which is in communication with a first environment exterior to the second passageway. The heating member is sized and configured to heat fluid traveling through the second passageway.

20 Claims, 7 Drawing Sheets

(51) Int. Cl.
*B64C 3/26* (2006.01)
*B64D 15/12* (2006.01)
(52) U.S. Cl.
CPC .... *B64C 2003/143* (2013.01); *H05B 2214/02* (2013.01)

(56) References Cited

U.S. PATENT DOCUMENTS

| | | |
|---|---|---|
| 1,771,257 A | 7/1930 | Ingram |
| 1,772,196 A | 8/1930 | Wallace |
| 1,806,927 A | 5/1931 | Aldrich |
| 1,810,693 A | 6/1931 | Alfaro |
| 1,845,307 A | 2/1932 | Maxwell |
| 1,861,336 A | 5/1932 | Cox |
| 1,888,871 A | 11/1932 | Apperman |
| 1,993,419 A | 3/1935 | Stalker |
| 2,039,676 A | 5/1936 | Zaparka |
| 2,041,795 A | 5/1936 | Stalker |
| 2,063,030 A | 12/1936 | Crouch |
| 2,071,744 A | 2/1937 | Anathor-Henrikson |
| 2,075,817 A | 4/1937 | Loerke |
| 2,077,071 A | 4/1937 | Rose |
| 2,078,854 A | 4/1937 | Jones |
| 2,082,674 A | 6/1937 | Young |
| 2,223,744 A | 12/1940 | Stalker |
| 2,225,525 A | 12/1940 | Pitcairn |
| 2,267,927 A | 12/1941 | Kightlinger |
| 2,352,144 A | 6/1944 | Woods |
| 2,406,918 A | 9/1946 | Stalker |
| 2,427,972 A | 2/1947 | Melchior |
| 2,421,694 A | 6/1947 | Hawkins |
| 2,438,942 A | 4/1948 | Polk |
| 2,464,726 A | 3/1949 | Stalker |
| 2,469,902 A | 5/1949 | Stalker |
| 2,478,793 A | 8/1949 | Trey |
| 2,507,611 A | 5/1950 | Pappas et al. |
| 2,511,504 A | 6/1950 | Hawkins |
| 2,514,513 A | 7/1950 | Price |
| 2,584,666 A | 2/1952 | Bockrath |
| 2,597,769 A | 5/1952 | Ashkenas |
| 2,605,983 A | 8/1952 | Stalker |
| 2,619,302 A | 11/1952 | Loedding |
| 2,714,495 A | 8/1955 | Focke |
| 2,809,793 A | 10/1957 | Warner |
| 2,892,582 A | 6/1959 | O'Rourke |
| 2,910,254 A | 10/1959 | Razak |
| 2,946,541 A | 7/1960 | Boyd |
| 3,029,043 A | 4/1962 | Churchill |
| 3,029,044 A | 4/1962 | Childress |
| 3,039,719 A | 6/1962 | Platt |
| 3,045,947 A | 7/1962 | Bertin et al. |
| 3,055,614 A | 9/1962 | Thompson |
| 3,097,817 A | 7/1963 | Towzey, Jr. |
| 3,101,678 A | 8/1963 | Grube |
| 3,128,063 A | 4/1964 | Kaplan |
| 3,144,220 A | 8/1964 | Kittelson |
| 3,161,377 A | 12/1964 | Balluff |
| 3,261,576 A | 7/1966 | Valyi |
| 3,262,658 A | 7/1966 | Reilly |
| 3,291,420 A | 12/1966 | Laing |
| 3,298,636 A | 1/1967 | Arnholdt |
| 3,430,894 A | 3/1969 | Strand et al. |
| 3,438,599 A | 4/1969 | Welzen |
| 3,441,236 A | 4/1969 | Arnholdt |
| 3,506,220 A | 4/1970 | Sbrilli |
| 3,507,463 A | 4/1970 | Kuntz |
| 3,540,681 A | 11/1970 | Orazi |
| 3,545,701 A | 12/1970 | Bertin et al. |
| 3,572,612 A | 3/1971 | Irbitis |
| 3,576,300 A | 4/1971 | Palfreyman |
| 3,586,267 A | 6/1971 | Ingelman-Sundberg |
| 3,658,279 A | 4/1972 | Robertson |
| 3,666,209 A | 5/1972 | Taylor |
| 3,807,663 A | 4/1974 | Bartoe, Jr. |
| 3,887,146 A | 6/1975 | Bright |
| 3,917,193 A | 11/1975 | Runnels, Jr. |
| 3,977,629 A | 8/1976 | Tubeuf |
| 4,033,526 A | 7/1977 | Benson |
| 4,086,022 A | 4/1978 | Freeman et al. |
| 4,117,995 A | 11/1978 | Runge |
| 4,375,937 A | 3/1983 | Cooper |
| 4,381,091 A | 4/1983 | Pegram |
| 4,391,424 A | 7/1983 | Bartoe, Jr. |
| 4,398,683 A | 8/1983 | Schmetzer |
| 4,398,688 A | 8/1983 | Williams |
| 4,804,155 A | 2/1989 | Strumbos |
| 4,828,203 A | 5/1989 | Clifton et al. |
| 4,848,701 A | 7/1989 | Belloso |
| 4,928,907 A | 5/1990 | Zuck |
| 4,976,349 A | 12/1990 | Adkins |
| 4,990,053 A | 2/1991 | Rohne |
| 5,016,837 A | 5/1991 | Willis |
| 3,011,762 A | 12/1991 | Pouit |
| 5,098,034 A | 3/1992 | Lendriet |
| 5,255,881 A | 10/1993 | Rao |
| 5,280,863 A | 1/1994 | Schmittle |
| 5,282,718 A | 2/1994 | Koff et al. |
| 5,335,885 A | 8/1994 | Bohning |
| 5,395,073 A | 3/1995 | Rutan et al. |
| 5,474,417 A | 12/1995 | Privett et al. |
| 5,542,149 A | 8/1996 | Yu |
| 5,586,859 A | 12/1996 | Nolcheff |
| 5,607,284 A | 3/1997 | Byrne et al. |
| 5,687,934 A | 11/1997 | Owens |
| 5,707,206 A | 1/1998 | Goto et al. |
| 5,765,777 A | 6/1998 | Schmittle |
| 5,769,359 A | 6/1998 | Rutan et al. |
| 5,899,416 A | 5/1999 | Meister et al. |
| 6,089,503 A | 7/2000 | Volk |
| 6,220,012 B1 | 4/2001 | Hauser et al. |
| 6,231,301 B1 | 5/2001 | Barnett et al. |
| 6,264,425 B1 | 7/2001 | Keller |
| 6,368,059 B1 | 4/2002 | Maines |
| 6,464,171 B2 | 10/2002 | Ruffin |
| 6,543,720 B2 | 4/2003 | Ladd |
| 6,669,142 B2 | 12/2003 | Saiz |
| 6,796,533 B2 | 9/2004 | Barrett et al. |
| 6,896,221 B1 | 5/2005 | Einarsson |
| 6,935,833 B2 | 8/2005 | Seitz |
| 7,074,006 B1 | 7/2006 | Hathaway et al. |
| 7,104,143 B1 | 9/2006 | Powell |
| 7,143,983 B2 | 12/2006 | McClure |
| 7,308,762 B2 | 12/2007 | Bath et al. |
| 7,441,724 B2 | 10/2008 | Parks |
| 7,520,465 B2 | 4/2009 | Mahjoub |
| 7,575,412 B2 | 8/2009 | Seitz |
| 7,673,832 B2 | 3/2010 | Meister |
| 7,837,438 B2 | 11/2010 | Campbell |
| 7,878,458 B2 | 2/2011 | Shmilovich et al. |
| 8,128,037 B2 | 3/2012 | Powell et al. |
| 8,128,364 B2 | 3/2012 | Pesetsky |
| 8,191,820 B1 | 6/2012 | Westra et al. |
| 8,246,311 B2 | 8/2012 | Pesetsky |
| 8,251,317 B2 | 8/2012 | Pitt |
| 8,251,319 B2 | 8/2012 | Jonker et al. |
| 8,262,031 B2 | 9/2012 | Zha et al. |
| 8,302,903 B2 | 11/2012 | Morgan et al. |
| 8,448,892 B2 | 5/2013 | Zhu |
| 8,459,597 B2 | 6/2013 | Cloft et al. |
| 8,469,907 B2 | 6/2013 | Ichihashi et al. |
| 8,485,476 B2 | 7/2013 | Zha et al. |
| 8,561,935 B2 | 10/2013 | Milde, Jr. |
| 8,829,706 B1 | 9/2014 | Sammy |
| 9,115,594 B2 | 8/2015 | Krautheim |
| 9,726,084 B2 | 8/2017 | Duong et al. |
| 9,815,545 B1 | 11/2017 | Steer |
| 10,252,789 B2 * | 4/2019 | Zha ..................... B64C 21/025 |
| 2002/0139894 A1 | 10/2002 | Sorensen |
| 2003/0035715 A1 | 2/2003 | Torrance |
| 2003/0150962 A1 | 8/2003 | Orban |
| 2005/0111968 A1 | 5/2005 | Lapworth |
| 2005/0226717 A1 | 10/2005 | Xu |
| 2006/0196633 A1 | 9/2006 | Mahjoub |
| 2007/0095970 A1 | 5/2007 | Richardson |

(56) References Cited

U.S. PATENT DOCUMENTS

| | | |
|---|---|---|
| 2007/0196204 A1 | 8/2007 | Seitz |
| 2007/0217902 A1 | 9/2007 | Sirakov et al. |
| 2007/0228222 A1 | 10/2007 | Davis |
| 2008/0044273 A1 | 2/2008 | Khalid |
| 2009/0014592 A1 | 1/2009 | Zha |
| 2009/0065631 A1 | 3/2009 | Zha |
| 2009/0095446 A1 | 4/2009 | Hamstra et al. |
| 2009/0108141 A1 | 4/2009 | Shmilovich |
| 2009/0173834 A1 | 7/2009 | Prince et al. |
| 2010/0127129 A1 | 5/2010 | Zha et al. |
| 2011/0001000 A1 | 1/2011 | Zhu |
| 2011/0001020 A1 | 1/2011 | Forgac |
| 2011/0210211 A1 | 9/2011 | Zha et al. |
| 2011/0215172 A1 | 9/2011 | Todorovic |
| 2012/0043428 A1 | 2/2012 | Goelling et al. |
| 2012/0068020 A1 | 3/2012 | Milde, Jr. |
| 2012/0074264 A1 | 3/2012 | Heaton |
| 2012/0145834 A1 | 6/2012 | Morgan et al. |
| 2012/0237341 A1 | 9/2012 | Simon |
| 2013/0206920 A1 | 8/2013 | Bichler et al. |
| 2014/0286746 A1 | 9/2014 | Nicholas et al. |
| 2014/0369812 A1 | 12/2014 | Caruel et al. |
| 2016/0009374 A1 | 1/2016 | Glezer |
| 2016/0368339 A1 | 12/2016 | Nam |
| 2017/0355450 A1 | 12/2017 | Zha |
| 2017/0355451 A1 | 12/2017 | Zha |
| 2018/0251211 A1 | 9/2018 | Zha |

FOREIGN PATENT DOCUMENTS

| | | |
|---|---|---|
| DE | 202011051844 U1 | 1/2012 |
| EP | 3254961 | 12/2017 |

OTHER PUBLICATIONS

World Intellectual Property Organization, English Translation of CN 104176241, retrieved from Internet Oct. 2, 2019, pp. 1-7.
European Patent Office, Extended European Search Report for Application No. 17175582.0, dated Nov. 9, 2017, pp. 1-5.
ESPACENET, Patent Translate of DE202011051844, pp. 1-9, retrieved from Internet Apr. 11, 2018.
European Patent Office, Extended European Search Report for Application No. 18202156.8, dated , Apr. 2, 2019, pp. 1-11.
European Patent Office. "Extended European Search Report" for EP application No. 19181825.1, dated Oct. 30, 2019, pp. 1-7.

* cited by examiner

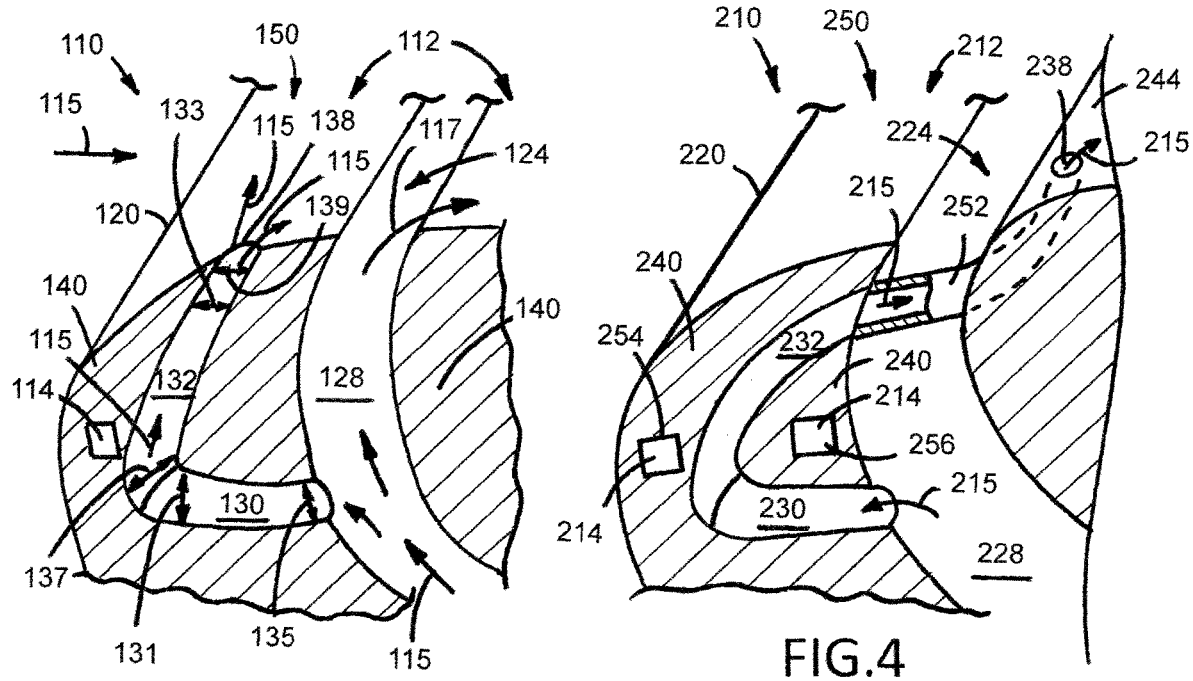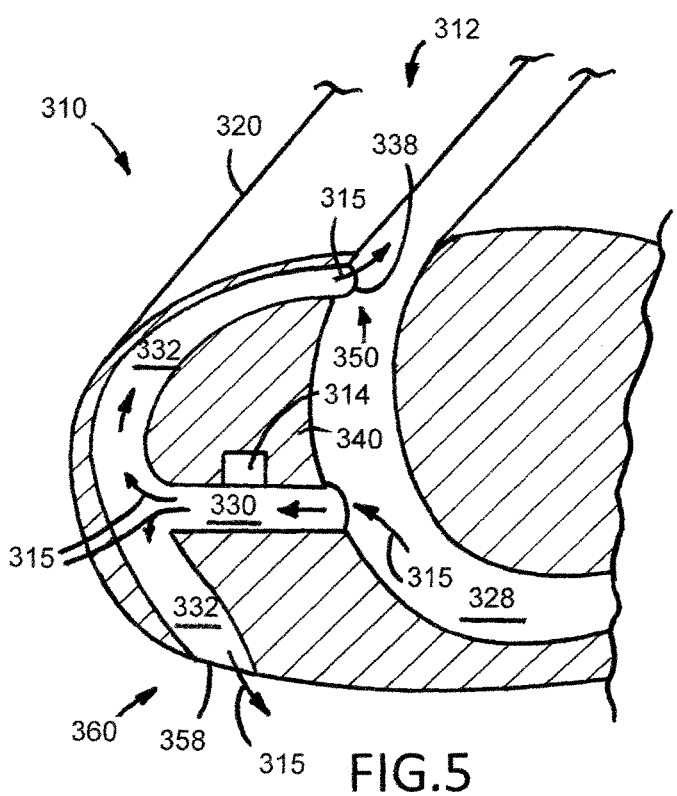

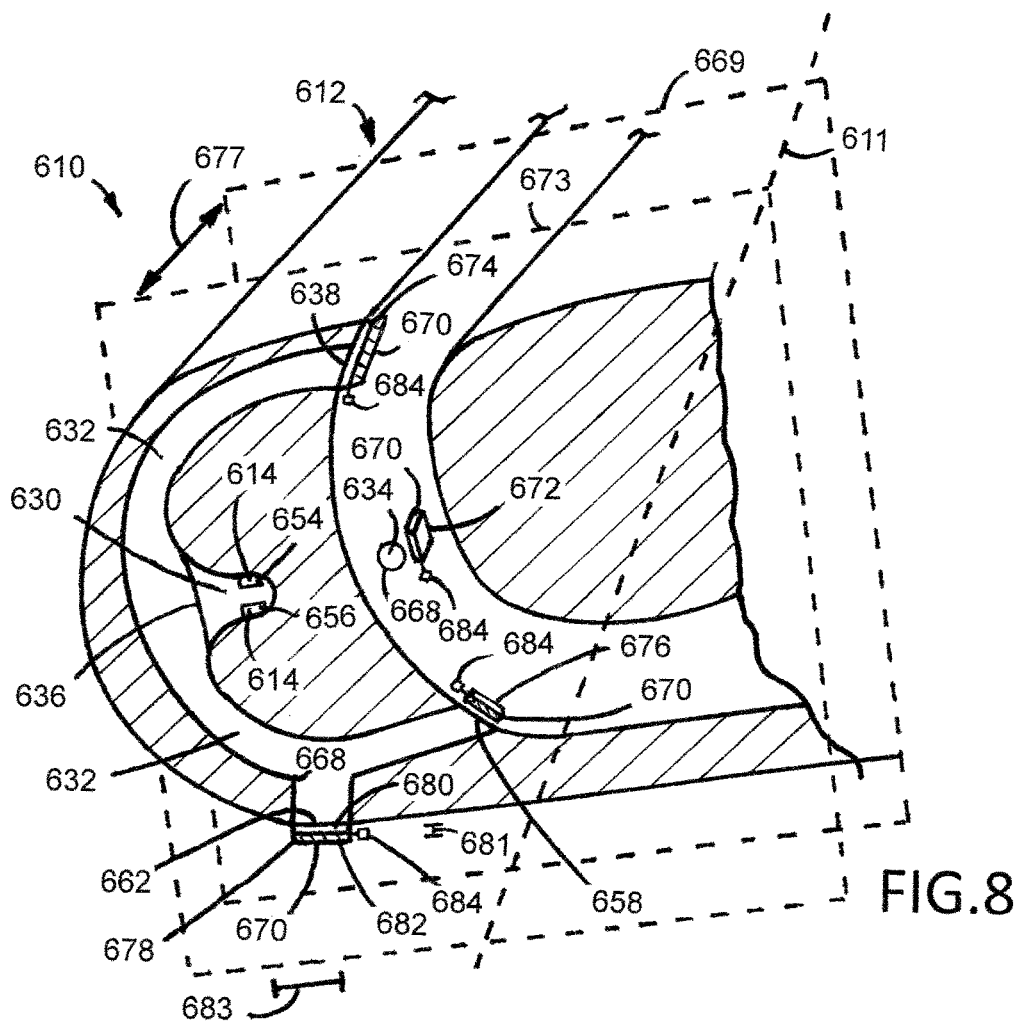
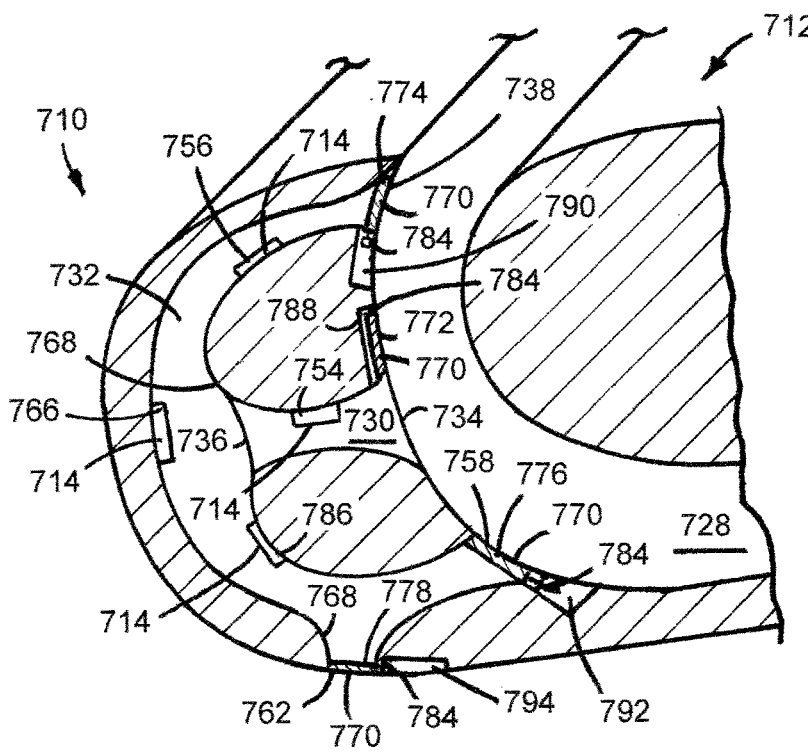

FLUID SYSTEMS THAT PREVENT THE FORMATION OF ICE

RELATED APPLICATION

This application claims the benefit of U.S. Provisional Application No. 62/688,479, filed Jun. 22, 2018. The entire disclosure of this related application is hereby incorporated into this disclosure by reference.

FIELD

The disclosure relates generally to the field of fluid systems. More particularly, the disclosure relates to fluid systems that prevent the formation of ice.

BACKGROUND

Generally, airfoils have a streamlined shape that allows fluid to pass around the airfoil in an efficient manner such that a desired lift and thrust can be achieved. However, when the airfoil is subjected to cold weather, ice accretion can occur on the airfoil, which can greatly reduce the airfoil's performance and increase the dangers associated with use of the airfoil. Current anti-icing techniques involve utilizing aircraft engine compressors to reduce the ice accretion. However, this approach results in high energy losses and reduces the engine's performance and thrust.

Therefore, a need exists for new and useful fluid systems that prevent the formation of ice.

SUMMARY OF SELECTED EXAMPLE EMBODIMENTS

Various examples of fluid systems are described herein.

An example fluid system includes a main body, a heating member, and a fluid pressurizer. The main body has a leading edge, a trailing edge, an injection opening disposed between the leading edge and the trailing edge, a suction opening disposed between the injection opening and the trailing edge, a channel that extends from the injection opening to the suction opening, a first passageway, a second passageway, a first opening, a second opening, and a third opening. The first passageway extends from the first opening to the second opening. The first opening is in communication with the channel and the second opening is in communication with the second passageway. The second passageway is in communication with the first passageway and extends to the third opening. The third opening is in communication with a first environment exterior to the second passageway. The heating member is attached to the main body and is sized and configured to heat fluid traveling through the second passageway. The fluid pressurizer is disposed within the channel.

Another example fluid system includes a main body, a heating member, a first valve, a second valve, and a fluid pressurizer. The main body has a leading edge, a trailing edge, an injection opening disposed between the leading edge and the trailing edge, a suction opening disposed between the injection opening and the trailing edge, a channel that extends from the injection opening to the suction opening, a first passageway, a second passageway, a first opening, a second opening, and a third opening. The first passageway extends from the first opening to the second opening. The first opening is in communication with the channel and the second opening is in communication with the second passageway. The second passageway is in communication with the first passageway and extends to the third opening. The third opening is in communication with the channel. The heating member is attached to the main body between the second passageway and the channel. The heating member is sized and configured to heat fluid traveling through the second passageway. The first valve is attached to the main body and is moveable between a first configuration in which fluid can flow through the first opening and a second configuration in which fluid is prevented from flowing through the first opening. The second valve is attached to the main body and is moveable between a first configuration in which fluid can flow through the third opening and a second configuration in which fluid is prevented from flowing through the third opening. The fluid pressurizer is disposed within the channel.

Another example fluid system includes a main body, a heating member, a first valve, a second valve, a third valve, a fourth valve, and a fluid pressurizer. The main body defines a wing of an aircraft and has a leading edge, a trailing edge, an injection opening disposed between the leading edge and the trailing edge, a suction opening disposed between the injection opening and the trailing edge, a channel that extends from the injection opening to the suction opening, a first passageway, a second passageway, a first opening, a second opening, a third opening, a fourth opening, and a fifth opening. The first passageway extends from the first opening to the second opening. The first opening is in communication with the channel and the second opening is in communication with the second passageway. The second passageway is in communication with the first passageway and extends from the third opening to the fourth opening. The third opening is in communication with the channel and the fourth opening is in communication with the channel. The fourth opening is disposed between the first opening and the suction opening. The fifth opening is disposed between the third opening and the fourth opening. The fifth opening is in communication with the second passageway and a first environment exterior to the second passageway. The heating member is attached to the main body and is sized and configured to heat fluid traveling through the second passageway. The first valve is attached to the main body and is moveable between a first configuration in which fluid can flow through the first opening and a second configuration in which fluid is prevented from flowing through the first opening. The second valve is attached to the main body and is moveable between a first configuration in which fluid can flow through the third opening and a second configuration in which fluid is prevented from flowing through the third opening. The third valve is attached to the main body and is moveable between a first configuration in which fluid can flow through the fourth opening and a second configuration in which fluid is prevented from flowing through the fourth opening. The fourth valve is attached to the main body and is moveable between a first configuration in which fluid can flow through the fifth opening and a second configuration in which fluid is prevented from flowing through the fifth opening. The fluid pressurizer is disposed within the channel.

Additional understanding of the exemplary fluid systems that prevent the formation of ice can be obtained by review of the detailed description, below, and the appended drawings.

BRIEF DESCRIPTION OF THE DRAWINGS

FIG. 3 is a partial perspective cross-sectional view of another example fluid system taken along a plane that is orthogonal to the lengthwise axis of the fluid system.

FIG. 4 is a partial perspective cross-sectional view of another example fluid system taken along a plane that is orthogonal to the lengthwise axis of the fluid system.

FIG. 5 is a partial perspective cross-sectional view of another example fluid system taken along a plane that is orthogonal to the lengthwise axis of the fluid system.

FIG. 8 is a partial perspective cross-sectional view of another example fluid system taken along a plane that is orthogonal to the lengthwise axis of the fluid system.

FIG. 9 is a partial perspective cross-sectional view of another example fluid system taken along a plane that is orthogonal to the lengthwise axis of the fluid system.

DETAILED DESCRIPTION

The following detailed description and the appended drawings describe and illustrate various example embodiments of fluid systems that prevent the formation of ice. The description and illustration of these examples are provided to enable one skilled in the art to make and use a fluid system that prevents the formation of ice. They are not intended to limit the scope of the claims in any manner.

Figure 1:
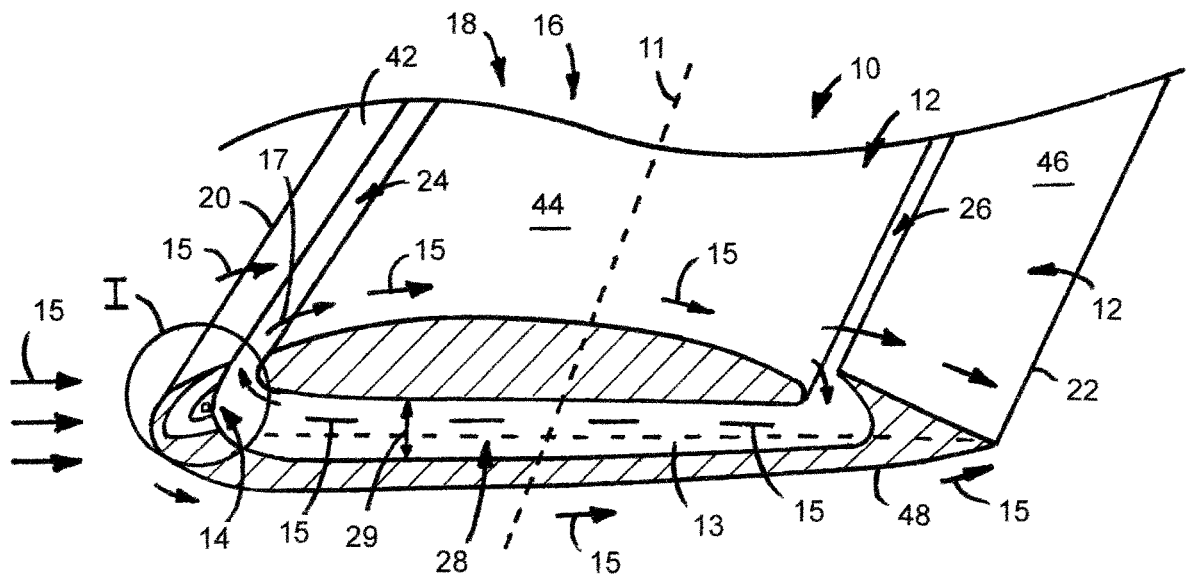
FIG. 1 is a partial perspective cross-sectional view of a first example fluid system taken along a plane that is orthogonal to the lengthwise axis of the fluid system.
Figure 2:
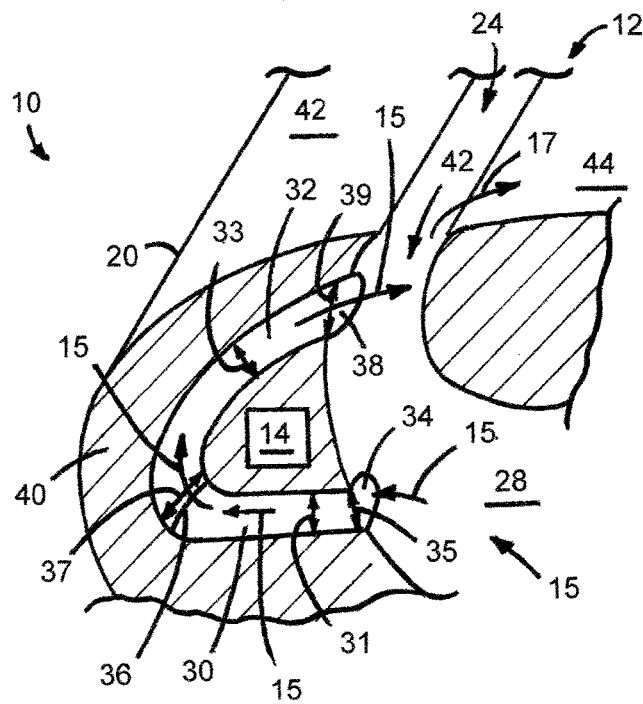
FIG. 2 is a magnified view of area I illustrated in FIG. 1.

FIGS. 1 and 2 illustrate an example fluid system 10 for an aircraft. The fluid system 10 has a lengthwise axis 11, a main body 12, a chord length 13, and a heating member 14. In the illustrated embodiment, the fluid system 10 is included on the airfoil 16 of a wing 18 of an aircraft and prevents the formation of ice on the wing 18. The fluid system 10 can be used to prevent the formation of ice on the main body 12.

In the illustrated embodiment, the main body 12 has a leading edge 20, a trailing edge 22, an injection opening 24, a suction opening 26, a channel 28, a first passageway 30, a second passageway 32, a first opening 34, a second opening 36, a third opening 38, a wall 40, a front surface 42, an intermediate surface 44, a rear surface 46, and a bottom surface 48. The injection opening 24 is disposed between the leading edge 20 and the trailing edge 22. The suction opening 26 is disposed between the injection opening 24 and the trailing edge 22. The channel 28 extends from the injection opening 24 to the suction opening 26 and has a channel inside diameter 29. The first passageway 30 extends from the first opening 34 to the second opening 36. The first opening 34 is in communication with the channel 28 and the second opening 36 is in communication with the second passageway 32. The first opening 34 is disposed between the injection opening 24 and the suction opening 26. The second passageway 32 is in communication with the first passageway 30 (e.g., via the second opening 36) and extends to the third opening 38. The third opening 38 is in communication with a first environment 42 exterior to the second passageway 32. In the illustrated embodiment, the first environment 42 exterior to the second passageway 32 is the channel 28 such that each of the second passageway 32 and the third opening 38 is in communication with the channel 28. The front surface 42 extends from the leading edge 20 to the injection opening 24. The intermediate surface 44 extends from the injection opening 24 to the suction opening 26. The rear surface 46 extends from the trailing edge 22 to the suction opening 26. The bottom surface 48 extends from the leading edge 20 to the trailing edge 22.

The first passageway 30 has a first passageway inside diameter 31, the second passageway 32 has a second passageway inside diameter 33, the first opening 34 has a first opening inside diameter 35, the second opening 36 has a second opening inside diameter 37, the third opening 38 has a third opening inside diameter 39. In the illustrated embodiment, the first passageway inside diameter 31 is equal to the second passageway inside diameter 33 and the first opening inside diameter 35 is equal to the second opening inside diameter 37 and the third opening inside diameter 39. Each of the first passageway inside diameter 31 and the first opening inside diameter 35 is less than the channel inside diameter 29.

While the first passageway inside diameter 31 has been illustrated as equal to the second passageway inside diameter 33, the first opening inside diameter 35 has been illustrated as equal to the second opening inside diameter 37 and the third opening inside diameter 39, and each of the first passageway inside diameter 31 and the first opening inside diameter 35 has been illustrated as being less than the channel inside diameter 29, a passageway and an opening included on a main body of a fluid system can have any suitable dimension relative to another feature of a fluid system. For example, a first passageway inside diameter can be equal to, greater than, less than, or about a second passageway inside diameter, a first opening inside diameter can be equal to, greater than, less than, or about a second opening inside diameter, a third opening inside diameter, a fourth opening inside diameter, and/or a fifth opening inside diameter, and/or a first passageway inside diameter, a second passageway inside diameter, a first opening inside diameter, a second opening inside diameter, a third opening inside diameter, a fourth opening inside diameter, and/or a fifth opening inside diameter can be equal to, greater than, less than, or about a channel inside diameter.

A main body of a fluid system can have any suitable structural configuration and selection of a suitable structural configuration can be based on various considerations, including the intended use of a fluid system. For example, a main body can be an integrated component or have a first body portion and a second body portion attached to the first body portion using a plurality of supports. In embodiments in which the main body has first and second body portions, the first body portion and the second body portion can cooperatively define the channel. Examples of suitable structural configurations for a main body, a first body portion, a second body portion, a plurality of supports, and other elements, features, and/or components that can be included in a fluid system described herein include those illustrated and described in U.S. patent application Ser. No. 15/426,084 by Zha and filed on Feb. 7, 2017, which is incorporated by reference herein in its entirety, U.S. patent application Ser. No. 15/255,523 by Zha and filed on Sep. 2, 2016, which is incorporated by reference herein in its entirety, U.S. Provisional Patent Application No. 62/649,703 by Zha and filed on Mar. 29, 2018, which is incorporated by reference herein in its entirety, and/or U.S. patent application Ser. No. 16/135,120 by Zha and filed on Sep. 19, 2018, which is incorporated by reference herein in its entirety.

The heating member 14 is attached to the main body 12 and is sized and configured to heat fluid traveling through the first passageway 30 or the second passageway 32. In the illustrated embodiment, the heating member 14 is disposed within the wall 40 of the main body 12 between the first passageway 30 and second passageway 32 and between the second passageway 32 and the channel 28 such that the heating member 14 heats the material forming the wall 40 of the main body 12 and fluid traveling through both the first passageway 30 and the second passageway 32. In addition, the heating member 14 heats the material forming the wall 40 of the main body 12 and fluid traveling through the channel 28. The heating member 14 has an off state and an on state. In the off state, the heating member 14 does not produce heat. In the on state, the heating member 14 produces heat.

While a single heating member has been illustrated as being positioned at a specific location on a main body, any suitable number of heating members can be positioned at any suitable location on a main body. Selection of a suitable number of heating members to include in a fluid system and of a location to position a heating element on a main body can be based on various considerations, including the amount of heat desired to be imparted on fluid passing through a first passageway, second passageway, and/or channel. Examples of numbers of heating members considered suitable to include in a fluid system include one, at least one, two, a plurality, three, four, five, six, seven, eight, nine, ten, more than ten, and any other number considered suitable for a particular embodiment. Examples of locations considered suitable to position a heating member on a main body include between a first passageway and a second passageway, between a second passageway and a channel, between a first passageway and a channel, between a leading edge and a first passageway, between a leading edge and a second passageway, between a passageway and a bottom surface of a main body, within a channel, within a first passageway, within a second passageway, within a wall of a main body, and/or any other location considered suitable for a particular embodiment.

A heating member included in a fluid system can comprise any suitable device, system, or component capable of heating the material within which the heating member is disposed and/or fluid passing through a passageway and/or channel and selection of a suitable heating member can be based on various considerations, such as the structural arrangement of a first passageway and/or second passageway. Examples of heating members considered suitable to include in a fluid system include electric heating devices, such as electric heaters, exhaust shroud heaters, combustion heaters, heating members that include one or more fans, and any other heating member considered suitable for a particular embodiment. In the illustrated embodiment, the heating member 14 is an electric heater. A heating member included in a fluid system can be operatively connected to any suitable portion of the device, system, or component on which the fluid system is disposed to provide power to the heating member (e.g., via a battery, via an engine) and/or to provide a mechanism for moving the heating member between an off state and an on state (e.g., one or more switches). Alternative embodiments can include a heating member that can vary the degree to which heat is provided to a wall of a main body, a passageway, and/or channel.

In use, when the heating member 14 is moved from its off state to its on state, it produces heat that is transferred to the main body 14 and into each of the first passageway 30 and the second passageway 32. This provides a mechanism for preventing, reducing, and/or removing any ice that has formed on the main body 12 (e.g., leading edge). In embodiments in which the fluid system 10 is included on the airfoil 16 of a wing 18 of an aircraft, the heating member 14 can be utilized during flight, during takeoff, during landing, during taxi, pre-flight, and at any other suitable time.

As shown in FIG. 1 the fluid flow 15 interacts with the fluid system 10 such that the fluid, which in this example is air, travels around, and through, the fluid system 10. The fluid travels into the suction opening 26, travels through the channel 28, exits at the injection opening 24, and is injected into the fluid flow as a jet 17 over the top of the main body 12. In addition, fluid traveling through the first passageway 30 and the second passageway 32 and exiting the second passageway 32 is introduced into the fluid traveling through the channel 28. In the illustrated embodiment, the jet 17 of fluid is substantially tangential to the intermediate surface 44 of the main body 12 downstream of the injection opening 24. The jet 17 is considered a co-flow jet in that it forms a stream of fluid that is injected into a separate fluid, or fluid flow. However, alternative embodiments can include one or more jets that are not tangential to an intermediate surface of a main body.

FIG. 3 illustrates another example fluid system 110. The fluid system 110 is similar to the fluid system 10 illustrated in FIGS. 1 and 2 and described above, except as detailed below. The fluid system 110 has a main body 112 and a heating member 114.

In the illustrated embodiment, the second passageway 132 is in communication with the first passageway 130 and extends to the third opening 138. The third opening 138 is disposed between the leading edge 120 and the injection opening 124 and is in communication with a first environment 150 exterior to the second passageway 132. In the illustrated embodiment, each of the second passageway 132 and the third opening 138 is in communication with an environment exterior to the channel 128. The first passageway inside diameter 131 is greater than the second passageway inside diameter 133 and the first opening inside diameter 135 is less than the second opening inside diameter 137 and the third opening inside diameter 139.

The heating member 114 is attached to the main body 112 and is sized and configured to heat fluid traveling through the second passageway 132. In the illustrated embodiment, the heating member 114 is disposed within the wall 140 of the main body 112 between the leading edge 120 and the second passageway 132 such that the heating member 114 heats the material forming the wall 140 of the main body 112 and fluid traveling through the second passageway 132.

As shown in FIG. 3 the fluid flow 115 interacts with the fluid system 110 such that the fluid, which in this example is air, travels around, and through, the fluid system 110. The fluid travels into the suction opening, travels through the channel 128, exits at the injection opening 124, and is injected into the fluid flow as a jet 117 over the intermediate surface 144 of the main body 112. In addition, fluid traveling through the first passageway 130 and the second passageway 132 and exiting the second passageway 132 is introduced into the fluid traveling over the front surface of the main body 112.

FIG. 4 illustrates another example fluid system 210. The fluid system 210 is similar to the fluid system 10 illustrated in FIGS. 1 and 2 and described above, except as detailed below. The fluid system 210 has a main body 212, a plurality of heating members 214, and an elongate member 252.

In the illustrated embodiment, the second passageway 232 is in communication with the first passageway 230 and extends to the third opening 238. The third opening 238 is disposed between the injection opening 224 and the suction opening (not shown) and is in communication with a first environment exterior 250 to the second passageway 232. In the illustrated embodiment, each of the second passageway 232 and the third opening 238 is in communication with an environment exterior to the channel 228. In the illustrated embodiment, the elongate member 252 is attached to the main body 212, forms part of the second passageway 232, and extends across the channel 228.

A first heating member 254 of the plurality of heating members 214 is attached to the main body 212 and is sized and configured to heat fluid traveling through the second passageway 232. In the illustrated embodiment, the first heating member 254 is disposed within the wall 240 of the main body 212 between the leading edge 220 and the second passageway 232 such that the heating member 214 heats the material forming the wall 240 of the main body 212 and fluid traveling through the second passageway 232. A second heating member 256 of the plurality of heating members 214 is attached to the main body 212 and is sized and configured to heat fluid traveling through the first passageway 230 and the second passageway 232. In the illustrated embodiment, the second heating member 256 is disposed within the wall 240 of the main body 212 between the first passageway 230 and second passageway 232 and between the second passageway 232 and the channel 228 such that the heating member 214 heats the material forming the wall 240 of the main body 212 and fluid traveling through both the first passageway 230 and the second passageway 232. As shown in FIG. 4, fluid 215 traveling through the first passageway 230 and the second passageway 232 and exiting the second passageway 232 is introduced into the fluid traveling over the intermediate surface 244 of the main body 212.

FIG. 5 illustrates another example fluid system 310. The fluid system 310 is similar to the fluid system 10 illustrated in FIGS. 1 and 2 and described above, except as detailed below. The fluid system 310 has a main body 312 and a heating member 314.

In the illustrated embodiment, the main body 312 has a fourth opening 358, the second passageway 332 is in communication with the first passageway 330, and the second passageway 332 extends from the third opening 338 to the fourth opening 358. The third opening 338 is in communication with a first environment 350 exterior to the second passageway 332. In the illustrated embodiment, each of the second passageway 332 and the third opening 338 is in communication with the channel 328. The fourth opening 358 is disposed between the leading edge 320 and the trailing edge (not shown) and is in communication with a second environment 360 exterior to the second passageway 332 that is different than the first environment 350. In the illustrated embodiment, each of the second passageway 332 and the fourth opening 358 is in communication with an environment exterior to the channel 328.

The heating member 314 is attached to the main body 312 and is sized and configured to heat fluid traveling through the first passageway 330. In the illustrated embodiment, the heating member 314 is disposed within the wall 340 of the main body 312 between the second passageway 332 and the channel 328, between the first passageway 330 and the second passageway 332, and is in direct fluid communication with the first passageway 330 such that the heating member 314 heats fluid traveling through the first passageway 330. As shown in FIG. 5, fluid traveling through the first passageway 330 and the second passageway 332 and exiting the second passageway 332 is introduced into the fluid traveling through the channel 328 and fluid traveling over the bottom surface of the main body 312.

While heating member 314 has been illustrated as being in direct fluid communication with the first passageway 330, a heating member can be in direct fluid communication with any portion of a fluid system. Selection of a suitable portion of a fluid system for a heating member to be in direct fluid communication can be based on various considerations, including the desired amount of heat transfer intended to be imparted on fluid traveling through the portion of the fluid system. Examples of portions of a fluid system considered suitable for a heating member to be in direct fluid communication include a first passageway, a second passageway, a channel, and/or any other portion of a fluid system considered suitable for a particular embodiment. For example, a heating member can be direct fluid communication with a first passageway, a second passageway, and/or a channel using one or more ducts, fans, and any other structure considered suitable for a particular embodiment.

Figure 6:
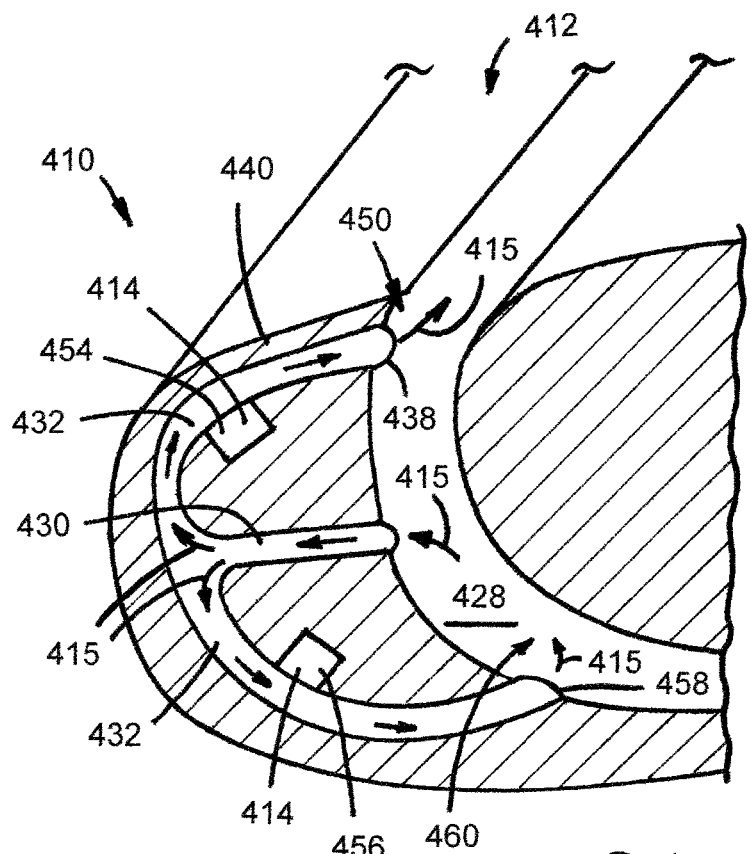
FIG. 6 is a partial perspective cross-sectional view of another example fluid system taken along a plane that is orthogonal to the lengthwise axis of the fluid system.

FIG. 6 illustrates another example fluid system 410. The fluid system 410 is similar to the fluid system 310 illustrated in FIG. 5 and described above, except as detailed below. The fluid system 410 has a main body 412 and a plurality of heating members 414.

In the illustrated embodiment, the main body 412 has a fourth opening 458, the second passageway 432 is in communication with the first passageway 430, and the second passageway 432 extends from the third opening 438 to the fourth opening 458. The third opening 438 is in communication with a first environment 450 exterior to the second passageway 432. In the illustrated embodiment, each of the second passageway 432 and the third opening 438 is in communication with the channel 428. The fourth opening 458 is disposed between the first opening 434 and the suction opening (not shown) and is in communication with a second environment 460 exterior to the second passageway 432 that is the same as the first environment 450. In the illustrated embodiment, each of the second passageway 432 and the fourth opening 458 is in communication with the channel 428.

A first heating member 454 of the plurality of heating members 414 is attached to the main body 412 and is sized and configured to heat fluid traveling through the second passageway 432. In the illustrated embodiment, the first heating member 454 is disposed within the wall 440 of the main body 412 between the second passageway 432 and the channel 428 and is in direct fluid communication with the second passageway 432 such that the first heating member 454 heats fluid traveling through the second passageway 432. A second heating member 456 of the plurality of heating members 414 is attached to the main body 412 and is sized and configured to heat fluid traveling through the second passageway 432. In the illustrated embodiment, the second heating member 456 is disposed within the wall 440 of the main body 412 between the second passageway 432 and the channel 428 and is in direct fluid communication with the second passageway 432 such that the second heating member 456 heats fluid traveling through the second passageway 432. As shown in FIG. 6, fluid 415 traveling through the first passageway 430 and the second passageway 432 and exiting the second passageway 432 is introduced into the fluid traveling through the channel 428.

Figure 7:
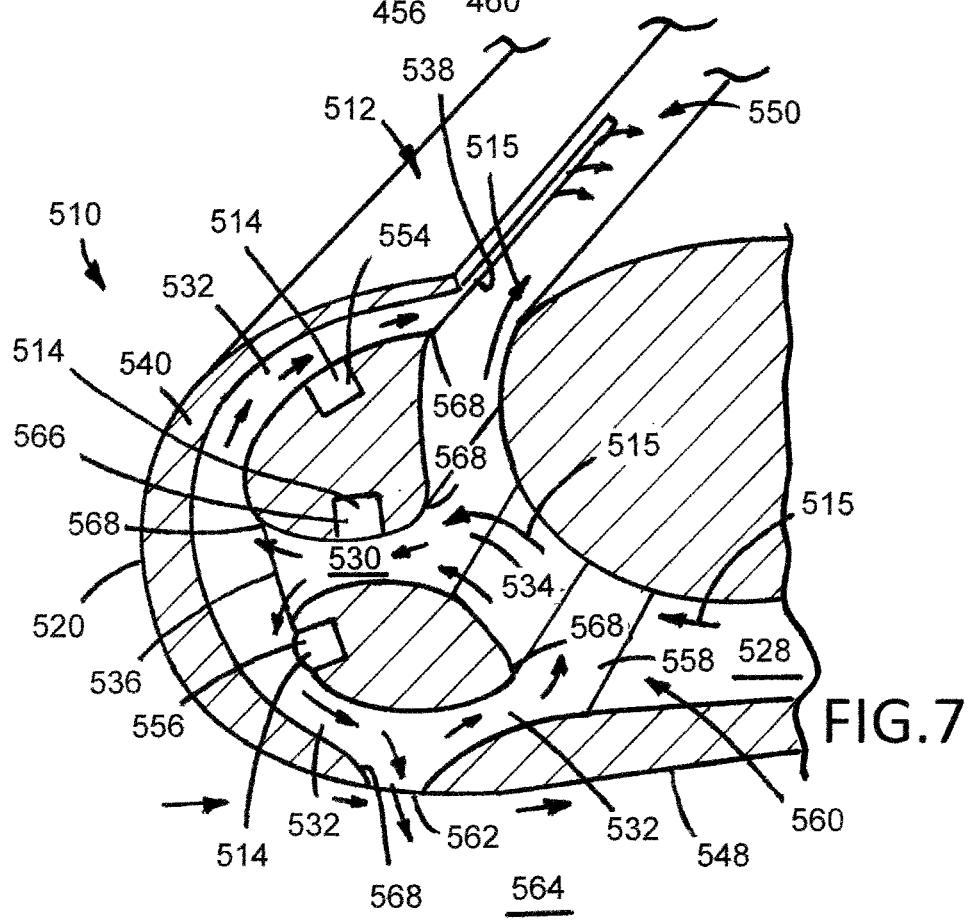
FIG. 7 is a partial perspective cross-sectional view of another example fluid system taken along a plane that is orthogonal to the lengthwise axis of the fluid system.

FIG. 7 illustrates another example fluid system 510. The fluid system 510 is similar to the fluid system 410 illustrated in FIG. 6 and described above, except as detailed below. The fluid system 510 has a main body 512 and a plurality of heating members 514.

In the illustrated embodiment, the main body 512 has a fourth opening 558 and a fifth opening 562, the second passageway 532 is in communication with the first passageway 530, and the second passageway 532 extends from the third opening 538 to each of the fourth opening 558 and the fifth opening 562. The third opening 538 is in communication with a first environment 550 exterior to the second passageway 532. In the illustrated embodiment, each of the second passageway 532 and the third opening 538 is in communication with the channel 528. The fourth opening 558 is disposed between the first opening 534 and the suction opening (not shown) and is in communication with a second environment 560 exterior to the second passageway 532 that is the same as the first environment 550. In the illustrated embodiment, each of the second passageway 532 and the fourth opening 558 is in communication with the channel 528. The fifth opening 562 is disposed between the leading edge 520 and the trailing edge (not shown), between the third opening 538 and the fourth opening 558, and is in communication with a third environment 564 exterior to the second passageway 532 that is different than the first environment 550. In the illustrated embodiment, each of the second passageway 532 and the fifth opening 562 is in communication with an environment exterior to the channel 528.

In the illustrated embodiment, each of the first passageway 530, the second passageway 532, the first opening 534, the second opening 536, the third opening 538, the fourth opening 558, and the fifth opening 562 is elongated such that it extends along a portion of the lengthwise axis of the fluid system 510. While each of the first passageway 530, the second passageway 532, the first opening 534, the second opening 536, the third opening 538, the fourth opening 558, and the fifth opening 562 has been illustrated as being elongated, a passageway and an opening included on a main body of a fluid system can have any suitable structural arrangement. Selection of a suitable structural arrangement for a passageway and/or opening included on a main body of a fluid system can be based on various considerations, including the desired volume of fluid intended to be passed through the passageway and/or the opening. Examples of structural arrangements considered suitable for a passageway included on a main body include elongated, symmetrical, cylindrical, prismatic, and any other structural arrangement considered suitable for a particular embodiment. Examples of structural arrangements considered suitable for an opening included on a main body include elongated, circular, square, rectangular, triangular, and any other structural arrangement considered suitable for a particular embodiment.

The transition between an opening and a surface of a main body and/or an opening and a passageway can have any suitable structural arrangement and selection of a suitable transition can be based on various considerations, including the desired flow characteristics of fluid flowing through and opening and/or passageway. Examples of transitions considered suitable between an opening and a surface of a main body and/or an opening and a passageway include curved, angled, hard (e.g., right angles), and any other transition considered suitable for a particular embodiment. In the embodiment illustrated in FIG. 7, the transitions 568 between the openings and surfaces of the main body 512 and between the second opening 536 and the second passageway 532 are curved.

While each of the first passageway 530, the second passageway 532, the first opening 534, the second opening 536, the third opening 538, the fourth opening 558, and the fifth opening 562 have been illustrated as disposed on a plane that is orthogonal to the lengthwise axis of the fluid system, a first passageway, a second passageway, a first opening, a second opening, a third opening, a fourth opening, and a fifth opening included in a fluid system can be disposed in any suitable orientation relative to one another. Selection of a suitable orientation to position a first passageway, a second passageway, a first opening, a second opening, a third opening, a fourth opening, and a fifth opening of a fluid system relative to one another can be based on various considerations, including the desired flow characteristics of fluid flowing through the fluid system. For example, one or more passageways and/or openings, or portions thereof, can be disposed on a first plane that extends through a lengthwise axis of a fluid system (e.g., orthogonally) and one or more passageways and/or openings, or portions thereof, can be disposed on a second plane that is different than the first plane and that extends through the lengthwise axis of the fluid system (e.g., orthogonally). Each of the first plane and the second plane can be disposed any suitable angle relative to the lengthwise axis and the second plane can be disposed at any suitable angle relative to the first plane. The first plane can be the same as, or different than, the second plane.

A first heating member 554 of the plurality of heating members 514 is attached to the main body 512 and is sized and configured to heat fluid traveling through the second passageway 532. In the illustrated embodiment, the first heating member 554 is disposed within the wall 540 of the main body 512 between the second passageway 532 and the channel 528 and is in direct fluid communication with the second passageway 532 such that the first heating member 554 heats fluid traveling through the second passageway 532. A second heating member 556 of the plurality of heating members 514 is attached to the main body 512 and is sized and configured to heat fluid traveling through the second passageway 532. In the illustrated embodiment, the second heating member 556 is disposed within the wall 540 of the main body 512 between the second passageway 532 and the channel 528 and is in direct fluid communication with the second passageway 532 such that the second heating member 556 heats fluid traveling through the second passageway 532. A third heating member 566 of the plurality of heating members 514 is attached to the main body 512 and is sized and configured to heat fluid traveling through the first passageway 530. In the illustrated embodiment, the third heating member 566 is disposed within the wall 540 of the main body 512 between the second passageway 532 and the channel 528, between the first passageway 530 and the second passageway 532, and is in direct fluid communication with the first passageway 530 such that the third heating member 566 heats fluid traveling through the first passageway 530. As shown in FIG. 7, fluid traveling through the first passageway 530 and the second passageway 532 and exiting the second passageway 532 is introduced into the fluid traveling through the channel 528 and fluid traveling over the bottom surface 548 of the main body 512.

FIG. 8 illustrates another example fluid system 610. The fluid system 610 is similar to the fluid system 510 illustrated in FIG. 7 and described above, except as detailed below. The fluid system 610 has a main body 612, a plurality of heating members 614, a plurality of valves 670, and a plurality of actuators 684.

In the illustrated embodiment, a portion of the first passageway 630 and the first opening 634 are disposed on a first plane 669 that extends through the lengthwise axis 611 of the fluid system 610 at a first angle and each of the second passageway 632, the second opening 636, the third opening 638, the fourth opening 658, and the fifth opening 662 is disposed on a second plane 673 that is different than the first plane 669 and that extends through the lengthwise axis 611 of the fluid system 610 at a second angle. Each of the first plane 669 and the second plane 673 can be disposed any suitable angle relative to the lengthwise axis 611. In the illustrated embodiment, each of the first angle and the second angle is an orthogonal angle and the first plane 671 and the second plane 673 are separated from one another along the lengthwise axis 611 a distance 677. This structural arrangement positions the first opening 634 such that it is offset from the second passageway 632, the second opening 636, the third opening 638, the fourth opening 658, and the fifth opening 662.

In the illustrated embodiment, each of the first passageway 630 and the second passageway 632 is cylindrical and each of the first opening 634, the second opening 636, the third opening 638, the fourth opening 658, and the fifth opening 662 is circular. In the embodiment illustrated in FIG. 8, the transitions 668 between the openings and surfaces of the main body 612 and are hard edges.

A first heating member 654 of the plurality of heating members 614 is attached to the main body 612 and is sized and configured to heat fluid traveling through the first passageway 630. In the illustrated embodiment, the first heating member 654 is disposed within the first passageway 630 between the second passageway 632 and the channel 628 and is in direct fluid communication with the first passageway 630 such that the first heating member 654 heats fluid traveling through the first passageway 630. A second heating member 656 of the plurality of heating members 614 is attached to the main body 612 and is sized and configured to heat fluid traveling through the first passageway 630. In the illustrated embodiment, the second heating member 656 is disposed within the first passageway 630 between the second passageway 632 and the channel 628 and is in direct fluid communication with the first passageway 630 such that the second heating member 656 heats fluid traveling through the first passageway 630.

A first valve 672 of the plurality of valves 670 is attached to the main body 612 within the channel 628 and is disposed adjacent the first opening 634. A second valve 674 of the plurality of valves 670 is attached to the main body 612 within the channel 628 and is disposed adjacent the third opening 638. A third valve 676 of the plurality of valves 670 is attached to the main body 612 within the channel 628 and is disposed adjacent the fourth opening 658. A fourth valve 678 of the plurality of valves 670 is attached to the main body 612 outside of the channel 628 and is disposed adjacent the fifth opening 662.

Each valve of the plurality of valves 670 has a first surface 680, a second surface 682, a thickness 681 that extends from the first surface 680 to the second surface 682, and a length 683. Each valve of the plurality of valves 670 has a first configuration, as shown with respect to the first valve 672 in FIG. 8, a second configuration, as shown with respect to the second valve 674 in FIG. 8, and is moveable between these configurations via actuators 684. In the first configuration, the valve is positioned such that fluid can flow through the opening positioned adjacent to the valve (e.g., in the first configuration the valve is positioned such that it does not seal the opening positioned adjacent to the valve). In the second configuration, the valve is positioned such that fluid is prevented from flowing through the opening positioned adjacent to the valve (e.g., in the second configuration the valve is positioned seals the opening positioned adjacent to the valve).

Each actuator of the plurality of actuators 684 is attached to the main body 612. An actuator of the plurality of actuators 684 is disposed adjacent to an opening of the main body 612 and is operatively connected to a valve of the plurality of valves 670. Each actuator of the plurality of actuators 684 is moveable between a first state and a second state and comprises the various components necessary to move a valve between a first configuration and a second configuration. Each actuator of the plurality of actuators 684 can be operatively connected to any suitable portion of the device, system, or component on which the fluid system is attached to provide power to the actuator (e.g., battery, electric motor) and/or to provide a mechanism for moving the actuator between the off state, the first state, and the second state (e.g., one or more switches).

In the first state, an actuator of the plurality of actuators 684 positions the valve adjacent to the actuator such that it is in the first configuration and fluid can flow through the opening positioned adjacent to the valve. In the second state, an actuator of the plurality of actuators 684 positions the valve adjacent to the actuator such that it is in the second configuration and fluid is prevented from flowing through the opening positioned adjacent to the valve.

A valve and an actuator included in a fluid system can comprise any suitable valve and actuator attached to any suitable portion of a fluid system and selection of a suitable valve and actuator can be based on various considerations, such as the structural arrangement of a main body included in a fluid system on which a valve and/or actuator is disposed and/or the material that forms a main body included in a fluid system. Examples of valves considered suitable to include in a fluid system include elongate plates that are sized and configured to interact with a main body to completely, or partially, seal an opening, channel, or passageway, butterfly valves, diaphragm valves, and any other valve considered suitable for a particular embodiment. Examples of actuators considered suitable to include in a fluid system include electric motors, pneumatic actuators, hydraulic actuators, actuators that produce rotational movement, actuators that produce axial movement, linear actuators, and any other actuator considered suitable for a particular embodiment.

While each valve of the plurality of valves 670 and each actuator of the plurality of actuators 684 has been illustrated as having a particular structural arrangement and as being positioned at a particular location on the main body, a valve and an actuator can have any suitable structural arrangement and be positioned at any suitable location on a main body. Selection of a suitable structural arrangement and/or position to locate a valve and an actuator can be based on various considerations, such as the desired flow around a fluid system and/or the desired flow through a channel defined through a fluid system. For example, alternative embodiments can include a valve and an actuator in each passageway included in a fluid system to accomplish movement of the valve between the first and second configurations, as described herein. In these embodiment, the valve and actuator are not disposed within a channel. In other embodiments, a valve and actuator can be disposed adjacent a portion of, or none of, the openings of a main body. Any of the embodiments described herein can include a valve and an actuator as described herein positioned adjacent to an opening. While a particular number of valves and actuators has been illustrated in FIG. 8, a fluid system, such as those described herein, can include any suitable number of valves and associated actuators. Selection of a suitable number of valves and actuators to include in a fluid system can be based on various considerations, including the number of openings and/or passageways included on a main body. Examples of numbers of valves and/or actuators considered suitable to include in a fluid system include one, at least one, two, a plurality, three, four, five, more than five, and any other number considered suitable for a particular embodiment.

FIG. 9 illustrates another example fluid system 710. The fluid system 710 is similar to the fluid system 610 illustrated in FIG. 8 and described above, except as detailed below. The fluid system 710 has a main body 712, a plurality of heating members 714, a plurality of valves 770, and a plurality of actuators 784.

In the illustrated embodiment, the first passageway 730 and the first opening 734 are disposed on a first plane that extends through the lengthwise axis of the fluid system 710 at a first angle and each of the second passageway 732, the second opening 736, the third opening 738, the fourth opening 758, and the fifth opening 762 is disposed on a second plane that is coplanar with the first plane and that extends through the lengthwise axis of the fluid system 710 at a second angle. Each of the first plane and the second plane can be disposed any suitable angle relative to the lengthwise axis. In the illustrated embodiment, each of the first angle and the second angle is an orthogonal angle. This structural arrangement positions the first opening 734 such that it is on the same plane as the second passageway 732, the second opening 736, the third opening 738, the fourth opening 758, and the fifth opening 762. In the embodiment illustrated in FIG. 9, the transitions 768 between the openings and surfaces of the main body 712 and are curved.

A first heating member 754 of the plurality of heating members 714 is attached to the main body 712 and is sized and configured to heat fluid traveling through the first passageway 730. In the illustrated embodiment, the first heating member 754 is disposed within the first passageway 730 between the second passageway 732 and the channel 728 and is in direct fluid communication with the first passageway 730 such that the first heating member 754 heats fluid traveling through the first passageway 730. A second heating member 756 of the plurality of heating members 714 is attached to the main body 712 and is sized and configured to heat fluid traveling through the second passageway 732. In the illustrated embodiment, the second heating member 756 is disposed within the second passageway 732 between the first passageway 730 and the channel 728 and is in direct fluid communication with the second passageway 732 such that the second heating member 756 heats fluid traveling through the second passageway 732. A third heating member 766 of the plurality of heating members 714 is attached to the main body 712 and is sized and configured to heat fluid traveling through the second passageway 732. In the illustrated embodiment, the third heating member 766 is disposed within the second passageway 732 along a lengthwise axis of the first passageway 730 and is in direct fluid communication with the second passageway 732 such that the third heating member 766 heats fluid traveling through the second passageway 732. A fourth heating member 786 of the plurality of heating members 714 is attached to the main body 712 and is sized and configured to heat fluid traveling through the second passageway 732. In the illustrated embodiment, the fourth heating member 786 is disposed within the second passageway 732 between the first passageway 730 and the channel 728 and is in direct fluid communication with the second passageway 732 such that the fourth heating member 786 heats fluid traveling through the second passageway 732.

The illustrated embodiment, the main body 712 defines a first recess 788, a second recess 790, a third recess 792, and a fourth recess 794. Each of the first recess 788, the second recess 790, the third recess 792, and the fourth recess 794 is sized and configured to receive and house a valve of the plurality of valves 770. The first recess 788 is sized and configured to receive the first valve 772 of the plurality of valves 770, which is attached to the main body 712 within the first passageway 730 and is disposed adjacent the first opening 734. The second recess 790 is sized and configured to receive the second valve 774 of the plurality of valves 770, which is attached to the main body 712 within the second passageway 732 and is disposed adjacent the third opening 738. The third recess 792 is sized and configured to receive the third valve 776 of the plurality of valves 770, which is attached to the main body 712 within the second passageway 732 and is disposed adjacent the fourth opening 758. The fourth recess 794 is sized and configured to receive the fourth valve 778 of the plurality of valves 770, which is attached to the main body 712 within the second passageway 732 and is disposed adjacent the fifth opening 762.

Each valve of the plurality of valves 770 has a first configuration, as shown with respect to the first valve 772 in FIG. 9, a second configuration, as shown with respect to the second valve 774 in FIG. 9, and is moveable between these configurations via actuators 784. In the first configuration, the valve is positioned such that fluid can flow through the opening positioned adjacent to the valve (e.g., in the first configuration the valve is positioned such that it does not seal the opening positioned adjacent to the valve). In the second configuration, the valve is positioned such that fluid is prevented from flowing through the opening positioned adjacent to the valve (e.g., in the second configuration the valve is positioned seals the opening positioned adjacent to the valve).

Figure 10:
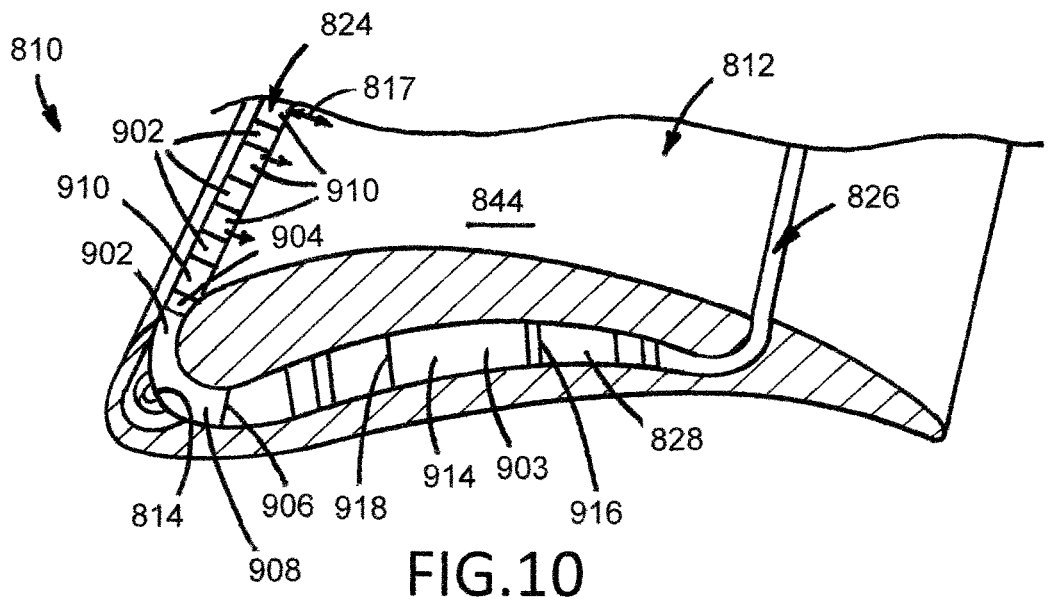
FIG. 10 is a partial perspective cross-sectional view of another example fluid system taken along a plane that is orthogonal to the lengthwise axis of the fluid system.

FIG. 10 illustrates another example fluid system 810. The fluid system 810 is similar to the fluid system 10 illustrated in FIGS. 1 and 2 and described above, except as detailed below. The fluid system 810 has a main body 812 and a heating member 814.

In the illustrated embodiment, the fluid system 810 includes a plurality of spacers 902 and a fluid pressurizer 903 disposed within the channel 828. Each spacer of the plurality of spacers 902 has a first end 904, a second end 900, and a main body 908 and is attached to the main body 812 to define a plurality of injection openings 910. In the illustrated embodiment, each spacer of the plurality of spacers 902 is partially disposed within the injection opening 824 such that the injection opening 824 is partially obstructed by each spacer of the plurality of spacers 902. Partially obstructing the injection opening 824 with the plurality of spacers 902 provides a mechanism for positioning a plurality of jets 817 along the intermediate surface 844 of the main body 812 and various lift profiles.

In the illustrated embodiment, the main body 908 of each spacer of the plurality of spacers 902 has a curved cuboidal structural arrangement that is configured to mate with a portion of the length of the channel 828, Each spacer of the plurality of spacers 902 can be attached to the main body 812 using any suitable technique or method of attachment and selection of a suitable technique or method of attachment between a spacer and a main body can be based on various considerations, including the material(s) that forms the spacer and/or the main body. Example techniques and methods of attachment considered suitable include welding, fusing, using adhesives, mechanical connectors, and/or forming the main body and each spacer as an integrated component. In the illustrated embodiment, each spacer of the plurality of spacers 902 is a separate component welded to the main body 812.

While each spacer of the plurality of spacers 902 has been illustrated as having a particular structural arrangement and as being positioned at a particular location on the fluid system 810, a spacer can be positioned at any suitable location on a fluid system and have any suitable structural arrangement. Selection of a suitable location to position a spacer and a suitable structural arrangement for a spacer can be based on various considerations, such as the desired flow through a channel defined by a fluid system and/or the desired flow around a fluid system. Spacers included in a fluid system can be spaced equally from one another (e.g., evenly), or be spaced at lengths that vary from one spacer to another, which can be based on the lift and thrust desired to be accomplished by the fluid system. Example structural arrangements considered suitable for a spacer include spacers that are cuboidal, curved cuboids, cylindrical spacers that include one or more curved surfaces, spacers that have a "C" cross-sectional shape such that a first portion is disposed at, or near, the injection opening of a fluid system and a second portion partially extends through a portion of the channel, and any other structural arrangement considered suitable for a particular embodiment.

While a plurality of spacers 902 has been illustrated, a fluid system can include any suitable number of spacers and selection of a suitable number of spacers to include in a fluid system can be based on various considerations, such as the desired fluid flow through a channel defined by a fluid system and/or the desired fluid flow around a fluid system. Examples of numbers of spacers considered suitable to include in a fluid system include one, at least one, two, a plurality, three, four, five, six, seven, eight, nine, ten, more than ten, and any other number considered suitable for a particular embodiment.

In the illustrated embodiment, the fluid pressurizer 903 is disposed within the channel 828 and is in communication with the injection opening 824 and the suction opening 826. The fluid pressurizer 903 is moveable between an off state and an on state and comprises a pump 914, a suction port 916, and a discharge port 918. The inclusion of a fluid pressurizer 903 provides a mechanism for pressurizing fluid passing through channel 828 and forming one or more jets 817 as the fluid exits the injection opening 824. A fluid pressurizer 903, such as pump 914, can be operatively connected to any suitable portion of the device, system, or component on which the fluid system is disposed to provide power to the fluid pressurizer 903 (e.g., battery, electric motor) and/or to provide a mechanism for moving the fluid pressurizer 903 between the off state and the on state (e.g., one or more switches). Alternative embodiments can include a fluid pressurizer that can vary the degree to which fluid is pressurized through the channel 828.

In the illustrated embodiment, the fluid pressurizer 903 is attached to the main body 812 and is positioned such that the suction port 916 is directed toward a first portion of the channel 828 that extends from the suction opening 826 to the pump 914 (e.g., the suction port 916 is directed toward the suction opening 826) and the discharge port 918 is directed toward a second portion of the channel 828 that extends from the injection opening 824 to the pump 914 (e.g., the discharge port 918 is directed toward the injection opening 824). In the off state, the pump 914 does not draw any fluid through the channel 828. In the on state, the pump 914 draws fluid through the suction opening 826, through the channel 828 and pump 914, and pushes fluid out of the injection opening 824.

A fluid pressurizer can be attached to a main body using any suitable technique or method of attachment and selection of a suitable technique or method of attachment between a fluid pressurizer and a main body can be based on various considerations, including the material(s) that forms the fluid pressurizer and/or the main body. Example techniques and methods of attachment considered suitable include welding, fusing, using adhesives, mechanical connectors, and any other technique or method considered suitable for a particular embodiment. In the illustrated embodiment, the fluid pressurizer 903 is fastened to the main body 812 using mechanical connectors (e.g., screws, bolts).

Figure 11:
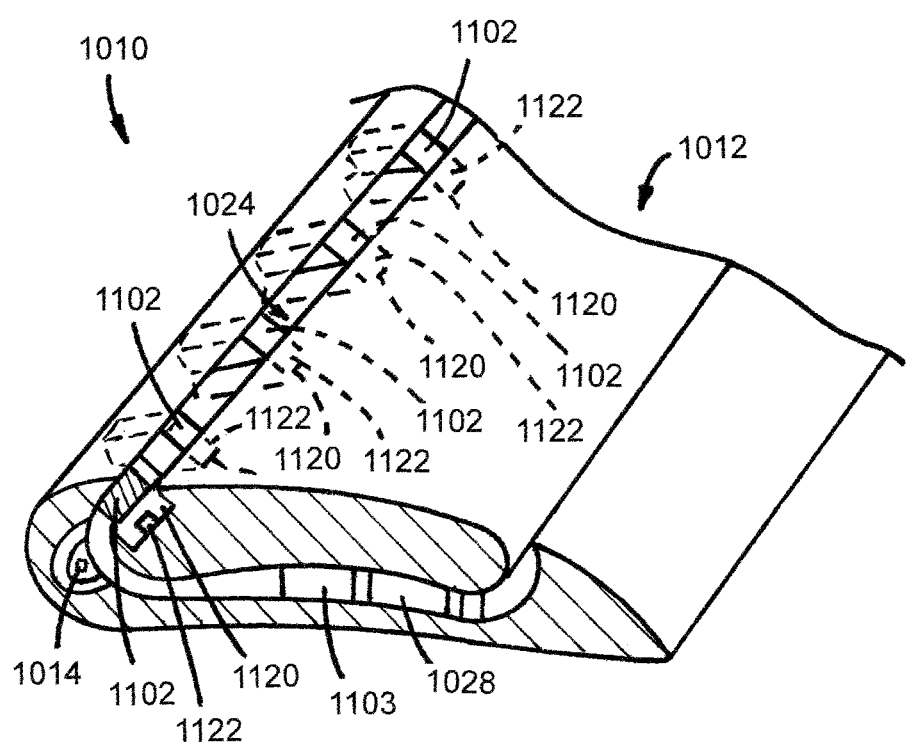
FIG. 11 is a partial perspective cross-sectional view of another example fluid system taken along a plane that is orthogonal to the lengthwise axis of the fluid system.

FIG. 11 illustrates another example fluid system 1010. The fluid system 1010 is similar to the fluid system 810 illustrated in FIG. 10 and described above, except as detailed below. The fluid system 1010 has a main body 1012, a heating member 1014, a plurality of spacers 1102, and a fluid pressurizer 1103.

In the illustrated embodiment, the main body 1012 defines a plurality of recesses 1120, the fluid system 1010 includes a plurality of spacer actuators 1122, and each spacer of the plurality of spacers 1102 is moveable between a first position, as shown in FIG. 11, and a second position. In the first position, a first volume of each spacer of the plurality of spacers 1102 is disposed within the channel 1028 and partially obstructs fluid flow through the channel 1028. In the second position, each spacer of the plurality of spacers 1102 is entirety disposed within a recess of the plurality of recesses 1120 such that a second volume of each spacer of the plurality of spacers 1102 is disposed within the channel 1128. In the illustrated embodiment, the first volume is greater than the second volume.

Each recess of the plurality of recesses 1120 extends from a first surface and into the main body 1012 and is sized and configured to receive a spacer of the plurality of spacers 1102 and a spacer actuator of the plurality of spacer actuators 1122. A spacer actuator included in a fluid system can comprise any suitable actuator and selection of a suitable actuator can be based on various considerations, such as the structural arrangement of a recess defined by a main body and/or the structural arrangement of a spacer included in a fluid system. Examples of spacer actuators considered suitable to include in a fluid system include electric motors, pneumatic actuators, hydraulic actuators, actuators that produce rotation movement around the lengthwise axis of an attached shaft, actuators that produce axial movement of a shaft along the lengthwise axis of the shaft, and any other actuator considered suitable for a particular embodiment. In the illustrated embodiment, each actuator of the plurality of spacer actuators 1122 is an electric motor.

Each spacer actuator of the plurality of spacer actuators 1122 is moveable between an off state, an open state, and a close state and comprises a motor and a threaded shaft. A spacer actuator of the plurality of spacer actuators is disposed within a recess of the plurality of recesses 1120 and is attached to a spacer of the plurality of spacers 1102. A spacer of the plurality of spacers 1102 is attached to the threaded shaft of each spacer actuator of the plurality of spacer actuators 1122. The motor can be operatively connected to any suitable portion of the device, system, or component on which the fluid system is disposed to provide power to the actuator (e.g., battery, electric motor) and/or to provide a mechanism for moving the actuator between the off state, the open state, and the close state (e.g., one or more switches). Each spacer actuator of the plurality of spacer actuators 1122 is positioned relative to a spacer of the plurality of spacers 1102 such that movement of the spacer can be achieved via movement of the actuator between its states.

In the off state, each spacer actuator of the plurality of spacer actuators 1122 maintains the position of the spacer attached to the spacer actuator relative to the main body 1012. In the open state, the threaded shaft rotates in a first direction about its lengthwise axis such that the attached spacer of the plurality of spacers 1102 advances into a recess of the plurality of recesses 1120 to its second position and the fluid passing through the channel 1028 can pass over the spacer and out of the injection opening 1024. In the second position, each spacer of the plurality of spacers 1102 is disposed within a recess of the plurality of recesses 1120 such that it does not obstruct any fluid flowing through channel 1028 and a portion (e.g., surface) of each spacer of the plurality of spacers 1120 is disposed on a hypothetical surface that extends over the recess within which it is disposed and that is continuous with the main body 1012. In the close state, the threaded shaft rotates in a second direction, opposite that of the first direction, about its lengthwise axis such that the attached spacer of the plurality of spacers 1102 advances out of a recess of the plurality of recesses 1120 to its first position, as shown in FIG. 11, and the fluid passing through the channel 1028 is obstructed by the spacer. In the first position, each spacer of the plurality of spacers 1102 is partially disposed outside of a recess of the plurality of recesses 1120 such that it obstructs the fluid flowing through channel 1028.

While each spacer of the plurality of spacers 1102 has been described as moveable between a first position and a second position, any suitable number of spacers of a plurality of spacers can be moveable between a first position and a second position. Selection of a suitable number of spacers of a plurality of spacers to include in a fluid system that are moveable can be based on various considerations, such as the desired flow through a channel defined by a fluid system. For example, one or more spacers can be fixed in place, such as those described with respect to FIG. 10, and one or more spacers can be moveable between a first position and a second position, such as those described with respect to FIG. 11, as described in more detail herein. The inclusion of a spacer that is, or a plurality of spacers that are, moveable between a first position in which the spacer, or each spacer of the plurality of spacers, obstructs a portion of the injection opening and a second position in which the spacer, or each spacer of the plurality of spacers, does not obstruct a portion of the injection opening provides a user of the fluid system with a mechanism to manipulate the power consumption of the fluid system, the fluid forces being applied to the fluid system, and/or the flow characteristics of fluid across the main body and/or channel during use of the fluid system (e.g., during flight). For example, when a fluid system, such as fluid system 1010 illustrated herein with respect to FIG. 11 is included on the wing of an aircraft, a large thrust may be desired at takeoff and a small amount of lift may be desired at cruise altitude. In this example, a spacer, or a plurality of spacers, can be positioned in the first position during takeoff and the spacer, or the plurality of spacers, can be positioned in the second position during flight at cruise altitude to increase the thrust at takeoff, reduce the lift required at cruise altitude, and reduce the energy required to achieve lift and thrust.

While a plurality of spacer actuators 1122 has been illustrated, a fluid system can include any suitable number of actuators and selection of a suitable number of actuators to include in a fluid system can be based on a various considerations, such as the structural arrangement of a spacer, or a plurality of spacers, included in the fluid system. For example, a single actuator can be operatively attached to each spacer of a plurality of spacers (e.g., using an elongate member) such that movement of the actuator between the off state, open state, and closed state moves each spacer of the plurality of spacers attached to the actuator between its first and second positions.

While a spacer of the plurality of spacers 1102 has been illustrated as being disposed within a recess of the plurality of recesses 1120 when in its second position such that it does not obstruct any fluid flowing through channel 1028, a spacer can have any suitable structural configuration relative to a channel when in its first position and/or second position. Selection of a suitable structural configuration for a spacer in the first position and second position can be based on various considerations, such as the desired flow through a channel defined by a fluid system. For example, alternative to being entirety disposed within a recess defined by a main body in the second position, a spacer can be partially disposed within the channel when the spacer is in the second position such that it is partially disposed in the channel and partially obstructs fluid flow through the channel. While the main body 1012 has been illustrated as defining a plurality of recesses 1120 and each recess of the plurality of recesses 1120 is illustrated as having an actuator of the plurality of spacer actuators 1122 disposed in the recess, alternative embodiments can include any suitable structural arrangement to accomplish movement of a spacer between the configurations described herein.

Figure 12:
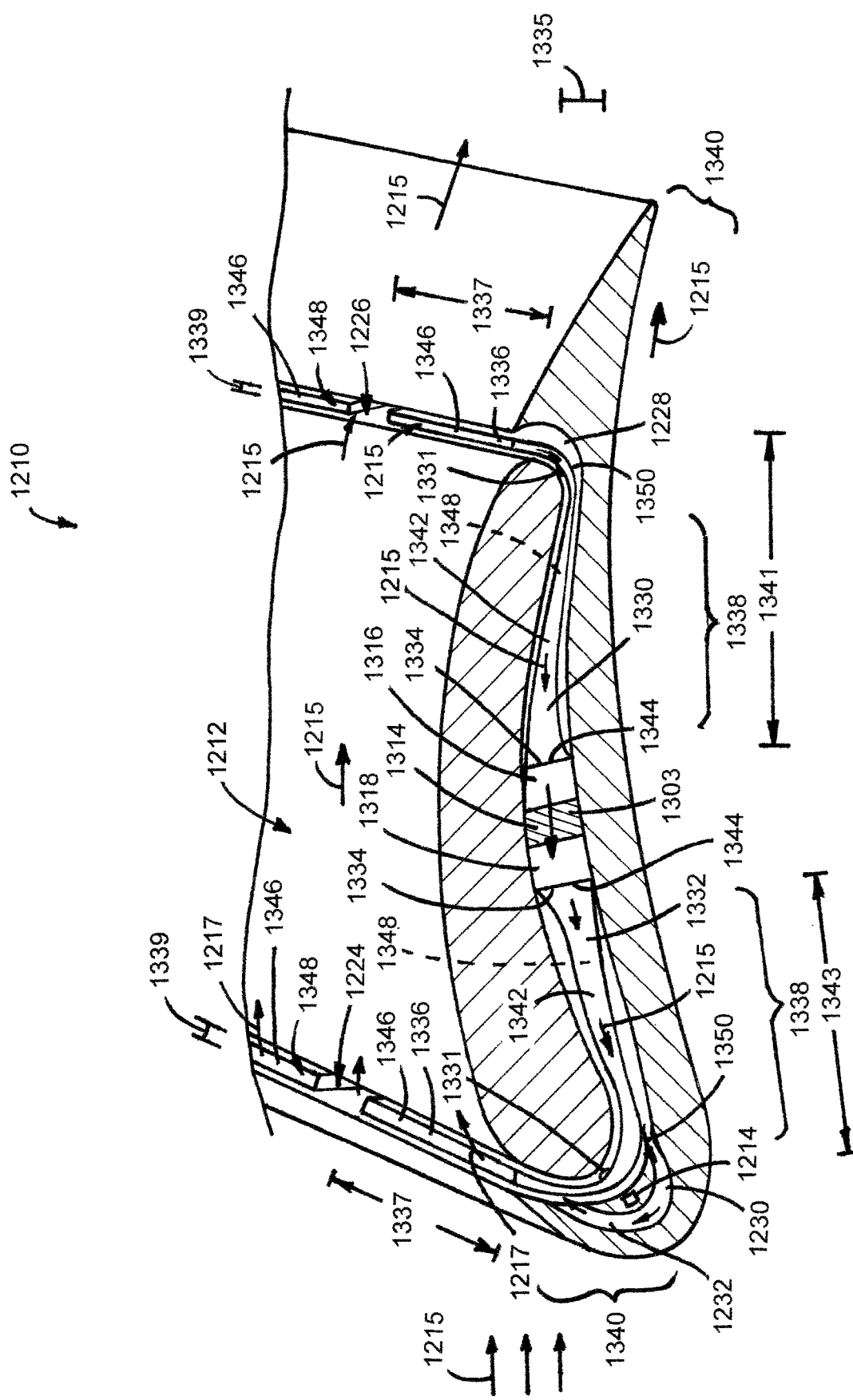
FIG. 12 is a partial perspective cross-sectional view of another example fluid system taken along a plane that is orthogonal to the lengthwise axis of the fluid system.
Figure 13:
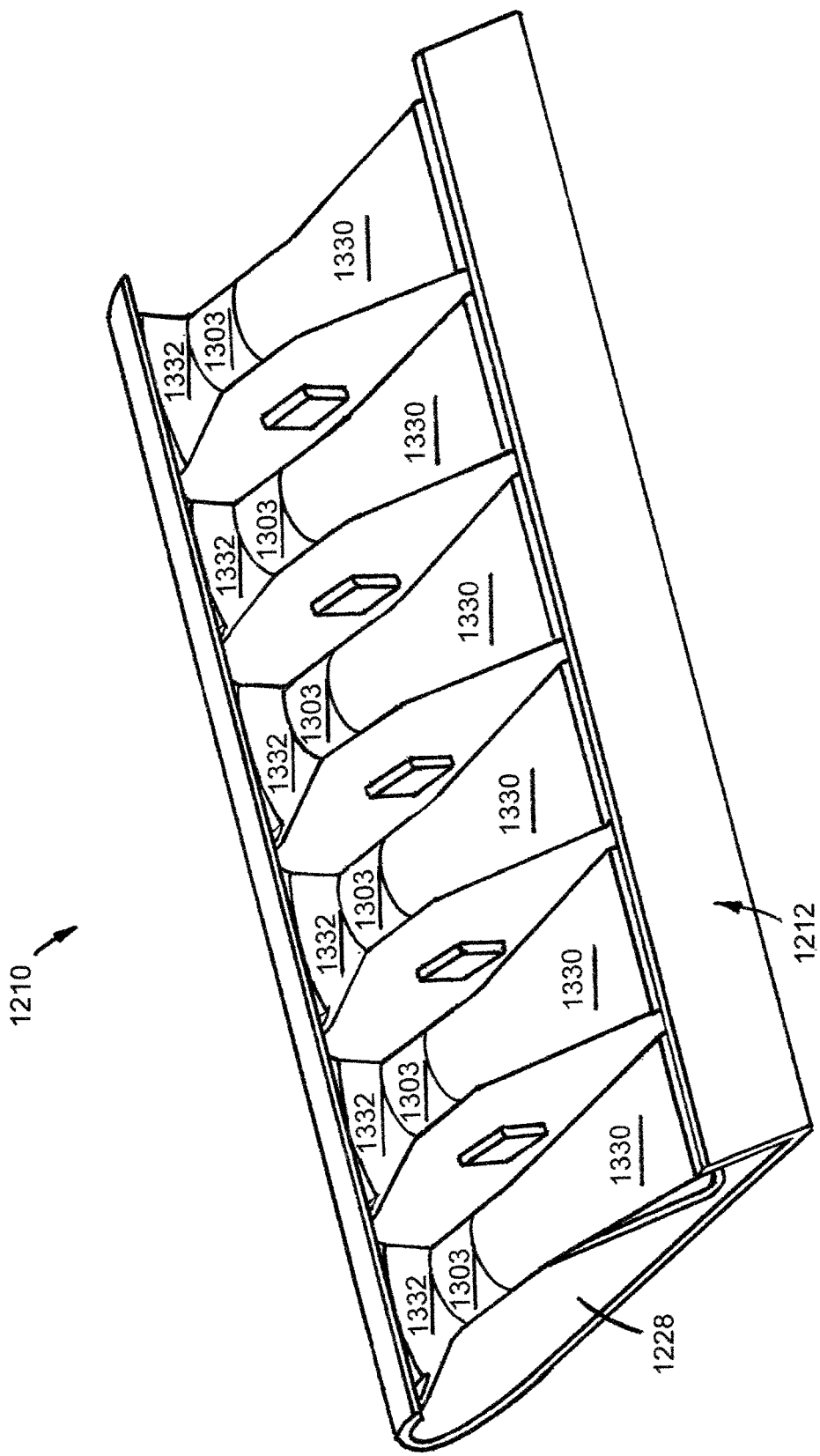
FIG. 13 is a partial perspective view of the fluid system illustrated in FIG. 12.

FIGS. 12 and 13 illustrate another example fluid system 1210. The fluid system 1210 is similar to the fluid system 10 illustrated in FIGS. 1 and 2 and described above, except as detailed below. The fluid system 1210 has a main body 1212, a heating member 1214, a plurality of fluid pressurizers 1303, a plurality of suction ducts 1330, and a plurality of injection ducts 1332.

In the illustrated embodiment, each fluid pressurizer of the plurality of fluid pressurizers 1303 is disposed within the channel 1228 and is in communication with the injection opening 1224 and the suction opening 1226. Each fluid pressurizer of the plurality of fluid pressurizers 1303 is moveable between an off state and an on state and comprises a pump 1314, a suction port 1316, and a discharge port 1318. Each fluid pressurizer of the plurality of fluid pressurizers 1303 is attached to the main body 1212 and is positioned such that the suction port 1316 is directed toward a first portion of the channel 1228 that extends from the suction opening 1226 to the pump 1314 (e.g., the suction port 1316 is directed toward the suction opening 1226) and the discharge port 1318 is directed toward a second portion of the channel 1228 that extends from the injection opening 1224 to the pump 1314 (e.g., the discharge port 1318 is directed toward the injection opening 1224). In the illustrated embodiment, each fluid pressurizer of the plurality of fluid pressurizers 1303 is disposed (e.g., entirely) within the channel 1228 and is in communication with a suction duct 1330 and an injection duct 1332, as described in more detail herein. In the off state, each fluid pressurizer of the plurality of fluid pressurizers 1303 does not draw any fluid through the ducts. In the on state, each fluid pressurizer of the plurality of fluid pressurizers 1303 draws fluid through the suction opening 1226 and a suction duct of the plurality of suction ducts 1330, through the fluid pressurizer, and pushes fluid out of an injection duct of the plurality of injection ducts 1332 and the injection opening 1224.

In the illustrated embodiment, each duct of the plurality of suction ducts 1330 and each duct of the plurality of injection ducts 1332 is attached to a port of a fluid pressurizer of the plurality of fluid pressurizers 1303, is entirely disposed within the channel 1228, and has a first end 1334, a second end 1336, a first portion 1338, a second portion 1340, and a main body 1342 that defines a first opening 1344 at the first end 1334, a second opening 1346 at the second end 1336, a passageway 1348 that extends from the first opening 1344 to the second opening 1346, and a curve 1350 between the first end 1334 and the second end 1336. Each suction duct of the plurality of suction ducts 1330 is attached to the suction port 1316 of a fluid pressurizer of the plurality of fluid pressurizers 1303 and extends from the fluid pressurizer toward the suction opening 1226. Each injection duct of the plurality of injection ducts 1332 is attached to the discharge port 1318 of a fluid pressurizer of the plurality of fluid pressurizers 1303 and extends from the fluid pressurizer toward the injection opening 1224. The first portion 1338 extends from the first end 1334 toward the second end 1336 and the second portion 1340 extends from the second end 1336 toward the first end 1334. The first portion 1338 is disposed at an angle 1331 relative to the second portion 1340 that is less than 90 degrees. However, other angles can be utilized, such as angle that are between about 80 degrees and 100 degrees, between about 70 degrees and about 110 degrees, between about 45 degrees and between about 80 degrees, between about 0 and 180 degrees, and any other angle considered suitable for a particular embodiment.

Each suction duct of the plurality of suction ducts 1330 and each injection duct of the plurality of injection ducts 1332 is attached to the main body 1212. A duct can be attached to a main body using any suitable technique or method of attachment and selection of a suitable technique or method of attachment between a duct and a main body can be based on various considerations, including the material(s) that forms duct and/or the main body portion. Example techniques and methods of attachment considered suitable include welding, fusing, using adhesives, mechanical connectors, and any other technique or method considered suitable for a particular embodiment. In the illustrated embodiment, each duct is fastened to the main body 1212 using mechanical connectors (e.g., screws, bolts).

The first opening 1344 has a first opening length, a first opening height 1335, and a first opening cross-sectional area and the second opening 1346 has a second opening length 1337, a second opening height 1339, and a second opening cross-sectional area that is less than the first opening cross-sectional area. The first opening length is equal to the first opening height 1335, is less than the second opening length 1337, and greater than the second opening height 1339. The second opening height 1339 is less than the second opening length 1337, less than the first opening length, and less than the first opening height 1335. The second opening height 1339 is equal to between about 0.01% and about 100% of the first opening height. The term "about" allowing for a 10% variation in listed value. Alternative embodiments, however, can include a second opening that has a second opening height that is about 2% of a first opening height, about 10% of a first opening height, between about 2% and about 10% of a first opening height, between about 2% and about 50% of a first opening height, and any other height considered suitable for a particular embodiment. The second opening cross-sectional area can be equal to any suitable value, such as equal to between about 10% and about 100% of the first opening cross-sectional area, between about 0.01% and about 10% of the first opening cross-sectional area, between about 0.01% and 200% of the first opening cross-sectional area, and any other suitable value. In the illustrated embodiment, the length of the passageway 1348 increases from the first end 1334 to the second end 1336 and the height of the passageway 1348 decreases from the first end 1334 to the second end 1336. In the illustrated embodiment, the first opening 1344 is centered relative to the second opening 1346 such that the center of the first opening 1344 is disposed on a plane that extends through the entire passageway 1348 and contains the center of the second opening 1346. Alternative embodiments, however, can include a first opening that is offset relative to the center of a second opening such that the center of the first opening is disposed on a first plane that extends through the passageway and is disposed parallel to a second plane that contains the center of the second opening and extends through the passageway.

As shown in FIGS. 12 and 13, the first opening 1344 has a first structural configuration and the second opening 1346 has a second structural configuration that is different than the first structural configuration. In the illustrated embodiment, the first opening 1344 is circular and the second opening 1346 is rectangular such that the cross-sectional configuration of the passageway 1348 transitions from the first end 1334 to the second end 1336. While the first opening 1344 has been illustrated as being circular and the second opening 1346 has been illustrated as being rectangular, a first opening and a second opening of a duct can have any suitable structural configuration relative to one another. Selection of a suitable structural configuration for a first opening and a second opening of a duct can be based on various considerations, including the intended use of the fluid system. Examples of structural configurations considered suitable for a first opening and/or a second opening of a duct include those that are the same, those that are different from one another, rectangular, square, circular, oval, elliptical, and/or any other structural arrangement considered suitable for a particular embodiment.

As shown in FIG. 12, each duct of the plurality of suction ducts 1330 has a length 1341 that is greater than the length 1343 of each duct of the plurality of injection ducts 1332. Each duct of the plurality of suction ducts 1330 is configured to allow a fluid to pass through the passageway 1348 from the second opening 1346 to the first opening 1344 such that the fluid enters the passageway 1348 at the second end 1336 at an angle that is directed toward a plane 1347 that extends through the first opening 1344 and a portion of the passageway 1348 that extends from the first opening 1344 toward the second opening 1346. Each duct of the plurality of injection ducts 1332 has a lengthwise axis that extends through the first opening 1344 and the first portion 1338. Each duct of the plurality of injection ducts 1332 is configured to allow a fluid to pass through the passageway 1348 from the first opening 1344 to the second opening 1346 such that the fluid exits the passageway 1348 at the second end 1346 at an angle that is directed toward a plane that is orthogonal to the lengthwise axis of the injection duct and away from the second end 1336.

While the fluid system 1210 has been illustrated as including a plurality of fluid pressurizers 1303 having a particular structural arrangement, a plurality of suction ducts 1330 having a particular structural arrangement, and a plurality of injection ducts 1332 having a particular structural arrangement, a fluid system can include any suitable number of fluid pressurizers and ducts having any suitable structural arrangement. Selection of a suitable number of fluid pressurizers and/or ducts to include in a fluid system can be based on various considerations, including the intended use of the fluid system. Examples of numbers of fluid pressurizers considered suitable to include in a fluid system include zero, one, at least one, two, a plurality, three, four, five, more than five, more than ten, and any other number considered suitable for a particular embodiment. Examples of numbers of ducts considered suitable to include in a fluid system include zero, one, at least one, two, a plurality, three, four, five, more than five, more than ten, one for each fluid pressurizer, two for each fluid pressurizer, a suction duct and an injection duct for one or more fluid pressurizers, or each fluid pressurizer, and any other number considered suitable for a particular embodiment. For example, a fluid system can include one or more injection ducts and omit the inclusion of any suctions ducts, or vice versa, or the type of duct included in the fluid system could alternate along the length of the fluid system. For example, a duct can alternatively define a bend, or another feature to position a first portion of a duct at an angle relative to a second portion of a duct. While the fluid system 1210 has been illustrated as including a plurality of suction ducts 1330 and a plurality of injection ducts 1332 that are entirely disposed within the channel 1228, a fluid system can include any suitable number of ducts having any suitable portion disposed within a channel. Selection of a suitable position to locate a duct can be based on various considerations, including the desired fluid flow through a fluid system. Examples of suitable positions to locate a duct include those in which the entire duct is positioned within a channel, a portion of a duct is positioned within a channel (e.g., the second end is disposed in an environment exterior to a channel), and any other position considered suitable for a particular embodiment. While each duct of the plurality of suction ducts 1330 and each duct of the plurality of injection ducts 1332 has been illustrated as being included in fluid system 1210, a duct, as described herein, can be included in any suitable system, or provided separately, and used for any suitable purpose.

As shown in FIG. 12 the fluid flow 1215 interacts with the fluid system 1210 such that the fluid, which in this example is air, travels around, and through, the fluid system 1210. The fluid travels into the suction opening 1226, through the plurality of suction ducts 1330, is pressurized by the plurality of fluid pressurizers 1303, travels through the plurality of injection ducts 1332, exits at the injection opening 1224, and is injected into the fluid flow as a plurality of jets 1217 over the main body 1212. In addition, fluid travels between the plurality of suction ducts 1330, plurality of fluid pressurizers 1303, and the plurality of injection ducts 1332 and the portion of the main body 1212 that defines the channel 1228 such that it can be combined with fluid traveling through the first passageway 1230 and the second passageway 1232 and exiting the second passageway 1232. Alternative embodiments, however, can include an arrangement in which each duct of a plurality of suction ducts is sized and configured to prevent fluid from traveling through a channel (e.g., such that fluid can only pass through suction ducts 1330 to the fluid pressurizers). Depending on the number of ducts, fluid pressurizers, channels, and/or passageways included in a fluid system, alternative embodiments can form a single jet over the top of the main body. In the illustrated embodiment, the plurality of jets 1217 of fluid is substantially tangential to the intermediate surface of the main body 1212 downstream of the injection opening 1224. The one or more jets 1217 are considered co-flow jets in that they form a stream of fluid that is injected into a separate fluid, or fluid flow. However, alternative embodiments can include one or more jets that are not tangential to an intermediate surface of a main body.

In the illustrated embodiment, the structure associated with a first passageway, a second passageway, one or more heating elements, one or more valves, one or more actuators, one or more spacers, and/or any other feature described herein can be included with respect to each injection duct and/or fluid pressurizer included in a fluid system. For example, the structure associated with a first passageway, a second passageway, one or more heating elements, one or more valves, one or more actuators, one or more spacers, and/or any other feature described herein can be included at multiple locations along the length of a main body.

While each of the first passageway 1230 and the second passageway 1232 has been illustrated as being in fluid communication with the channel 1228, alternative embodiments can include a first passageway and/or second passageway that is/are in fluid communication with a duct (e.g., direct fluid communication, indirect fluid communication) or can include one or more injection ducts that terminate within a channel such that an opening in fluid communication with a second passageway is disposed between the injection duct and an injection opening. Alternatively, a fluid system can omit the inclusion of one or more injection ducts and/or suction ducts.

A main body, a heating member, an elongate member, a valve, an actuator, a spacer, a fluid pressurizer, a duct, and any other feature, element, or component described herein and included in a fluid system can be formed of any suitable material and manufactured using any suitable technique. Selection of a suitable material to form a main body, a heating member, an elongate member, a valve, an actuator, a spacer, a fluid pressurizer, a duct, and any other feature, element, or component described herein and included in a fluid system and a suitable technique to manufacture a main body, a heating member, an elongate member, a valve, an actuator, a spacer, a fluid pressurizer, a duct, and any other feature, element, or component described herein and included in a fluid system can be based on various considerations, including the intended use of the fluid system. Example materials considered suitable to form a main body, a heating member, an elongate member, a valve, an actuator, a spacer, a fluid pressurizer, a duct, and/or any other feature, element, or component described herein include conventional materials, metals, steel, aluminum, alloys, plastics, combinations of metals and plastics, composite materials, and any other material considered suitable for a particular embodiment. Example methods of manufacture considered suitable to manufacture a main body, a heating member, an elongate member, a valve, an actuator, a spacer, a fluid pressurizer, a duct, and/or any other feature, element, or component described herein include convention methods and techniques, injection molding, machining, 3D printing, and/or any other method or technique considered suitable for a particular embodiment. For example, a main body of a fluid system can be formed of a first material and each duct included in the fluid system can be formed of a second material that is different than the first material. While the various features, elements, and components described herein and included in a fluid system have been illustrated as having a particular structural configuration, any feature, element, or component described herein and included in a fluid system can have any suitable structural arrangement. Selection of a suitable structural arrangement for a feature, element, or component described herein and included in a fluid system can be based on various considerations, including the intended use of the fluid system.

The embodiments described herein can be included on an airfoil of a wing of an aircraft capable of traveling at any suitable speed, including subsonic (e.g., between about Mach 0.6 and about Mach 0.95) and supersonic. When included on aircraft that will be completing transonic flights, or on aircrafts in which a shock wave may be created on the upper surface of the airfoil, an injection opening and/or suction opening can be disposed downstream from where a shock wave may be created, or between the trailing edge and where the shock wave may be created.

While the example fluid systems described herein have been illustrated as being included on a wing of an aircraft that has a constant chord length with no sweep angle, a fluid system, such as those described herein can be included in any suitable structure, device, and/or system. Selection of a suitable structure, device, and/or system to include a fluid system can be based on various considerations, such as the intended use of the structure, device, and/or system. Examples of structures, devices, and/or systems considered suitable to include a fluid system, such as those described herein, include aircraft, unmanned reconnaissance aircrafts, small person aircrafts, commercial airlines, wings of aircrafts, wings of aircrafts that have a varying chord length and/or sweep angle, wings of aircraft that are tapered, space shuttles, space exploratory aircrafts, exploratory aircrafts, airplanes, helicopters, rotorcraft rotor blades, vehicles, automobiles, cars, trucks, motorcycles, boats, locomotives, projectiles, turbines, wind turbines, blades of wind turbines, gas turbine engines, gas turbine engine compressors and/or fans, pumps, propellers, blades, sails, any structure, device, and/or system that uses airfoils, land vehicles, water vehicles, air vehicles, any structure, device, and/or system that is used to generate lift and/or thrust, and any other structure, device, and/or system considered suitable. For example, the fluid systems described herein can be used for exploratory missions to other planets, such as flights in the Martian atmosphere. The inclusion of a fluid system in these example embodiments reduce energy consumption, enhance lift, reduce drag, generate thrust, increase cruise aerodynamic efficiency, enhance maneuverability and safety, and reduce take off/landing distance required for structures, devices, and/or systems that include a fluid system, such as those described herein. Any of the embodiments described herein can include any suitable component of a conventional wing of an aircraft. For example, any of the embodiments described herein can include a flap and/or elevator (e.g., which can be moveable relative to the first body portion) that provides enhanced lift to the wing during flight.

Any of the herein described examples of fluid systems, and any of the features described relative to a particular example of a fluid system, can be included along a portion, or the entirety, of the span of a wing, blade, or other feature of a device, system, component (e.g., transportation vehicle) in which it is desired to include a fluid system. For example, any of the herein described embodiments, such as the fluid systems and/or ducts, can be combined in any suitable manner and include any of the features, devices, systems, and/or components described in U.S. patent application Ser. No. 15/426,084 by Zha and filed on Feb. 7, 2017, which is incorporated by reference herein in its entirety, U.S. patent application Ser. No. 15/255,523 by Zha and filed on Sep. 2, 2016, which is incorporated by reference herein in its entirety, U.S. Provisional Patent Application No. 62/649,703 by Zha and filed on Mar. 29, 2018, which is incorporated by reference herein in its entirety, and/or U.S. patent application Ser. No. 16/135,120 by Zha and filed on Sep. 19, 2018, which is incorporated by reference herein in its entirety.

Those with ordinary skill in the art will appreciate that various modifications and alternatives for the described and illustrated embodiments can be developed in light of the overall teachings of the disclosure. Accordingly, the particular arrangements disclosed are intended to be illustrative only and not limiting as to the scope of the invention, which is to be given the full breadth of the appended claims and any and all equivalents thereof.

What is claimed is:

1. A fluid system comprising:
a main body having a leading edge, a trailing edge, an injection opening disposed between the leading edge and the trailing edge, a suction opening disposed between the injection opening and the trailing edge, a channel extending from the injection opening to the suction opening, a first passageway, a second passageway, a first opening, a second opening, and a third opening, the first passageway extending from the first opening to the second opening, the first opening in communication with the channel and the second opening in communication with the second passageway, the second passageway in communication with the first passageway and extending to the third opening, the third opening in communication with a first environment exterior to the second passageway;
a heating member attached to the main body and sized and configured to heat fluid traveling through the second passageway; and
a fluid pressurizer disposed within the channel;
wherein the heating member is attached to the main body between the second passageway and the channel.

2. The fluid system of claim 1, wherein the heating member comprises a plurality of heating members.

3. The fluid system of claim 1, wherein the third opening is disposed between the leading edge and the injection opening.

4. The fluid system of claim 1, wherein the third opening is in communication with the channel.

5. The fluid system of claim 1, wherein the third opening is disposed between the injection opening and the suction opening.

6. The fluid system of claim 1, further comprising a first valve, and a second valve, the first valve attached to the main body and moveable between a first configuration in which fluid can flow through the first opening and a second configuration in which fluid is prevented from flowing through the first opening, the second valve attached to the main body and moveable between a first configuration in which fluid can flow through the third opening and a second configuration in which fluid is prevented from flowing through the third opening.

7. The fluid system of claim 1, wherein the main body has a fourth opening; and
wherein the second passageway extends from the third opening to the fourth opening, the fourth opening in communication with a second environment exterior to the second passageway.

8. The fluid system of claim 7, wherein the first environment and the second environment are different.

9. The fluid system of claim 7, wherein the fourth opening is in communication with the channel.

10. The fluid system of claim 9, wherein the fourth opening is disposed between the first opening and the suction opening.

11. The fluid system of claim 9, wherein the main body has a fifth opening in communication with the second passageway and a third environment exterior to the second passageway.

12. The fluid system of claim 11, wherein the fifth opening is disposed between the third opening and the fourth opening.

13. The fluid system of claim 11, wherein the second environment and the third environment are different.

14. The fluid system of claim 11, wherein the main body has a front surface, an intermediate surface, a rear surface, and a bottom surface, the front surface extending from the leading edge to the injection opening, the intermediate surface extending from the injection opening to the suction opening, the rear surface extending from the trailing edge to the suction opening, the bottom surface extending from the leading edge to the trailing edge; and
wherein the fifth opening is disposed on the bottom surface.

15. The fluid system of claim 1, further comprising a spacer attached to the main body and moveable between a first position in which the spacer obstructs a portion of the injection opening and a second position in which the spacer does not obstruct the portion of the injection opening.

16. The fluid system of claim 1, further comprising one or more ducts attached to the main body and disposed within the channel.

17. The fluid system of claim 1, wherein the main body defines a wing of an aircraft.

18. A fluid system comprising:
a main body having a leading edge, a trailing edge, an injection opening disposed between the leading edge and the trailing edge, a suction opening disposed between the injection opening and the trailing edge, a channel extending from the injection opening to the suction opening, a first passageway, a second passageway, a first opening, a second opening, and a third opening, the first passageway extending from the first opening to the second opening, the first opening in communication with the channel and the second opening in communication with the second passageway, the second passageway in communication with the first passageway and extending to the third opening, the third opening in communication with the channel;
a heating member attached to the main body between the second passageway and the channel, the heating member sized and configured to heat fluid traveling through the second passageway;
a first valve attached to the main body and moveable between a first configuration in which fluid can flow through the first opening and a second configuration in which fluid is prevented from flowing through the first opening;
a second valve attached to the main body and moveable between a first configuration in which fluid can flow through the third opening and a second configuration in which fluid is prevented from flowing through the third opening; and
a fluid pressurizer disposed within the channel.

19. A fluid system for an aircraft comprising:
a main body defining a wing of said aircraft and having a leading edge, a trailing edge, an injection opening disposed between the leading edge and the trailing edge, a suction opening disposed between the injection opening and the trailing edge, a channel extending from the injection opening to the suction opening, a first passageway, a second passageway, a first opening, a second opening, a third opening, a fourth opening, and a fifth opening, the first passageway extending from the first opening to the second opening, the first opening in communication with the channel and the second opening in communication with the second passageway, the second passageway in communication with the first passageway and extending from the third opening to the fourth opening, the third opening in communication with the channel and the fourth opening in communication with the channel, the fourth opening disposed between the first opening and the suction opening, the fifth opening disposed between the third opening and the fourth opening, the fifth opening in communication with the second passageway and a first environment exterior to the second passageway;
a heating member attached to the main body and sized and configured to heat fluid traveling through the second passageway; and
a first valve attached to the main body and moveable between a first configuration in which fluid can flow through the first opening and a second configuration in which fluid is prevented from flowing through the first opening;
a second valve attached to the main body and moveable between a first configuration in which fluid can flow through the third opening and a second configuration in which fluid is prevented from flowing through the third opening;
a third valve attached to the main body and moveable between a first configuration in which fluid can flow through the fourth opening and a second configuration in which fluid is prevented from flowing through the fourth opening;
a fourth valve attached to the main body and moveable between a first configuration in which fluid can flow through the fifth opening and a second configuration in which fluid is prevented from flowing through the fifth opening; and
a fluid pressurizer disposed within the channel.

20. A fluid system comprising:
a main body having a leading edge, a trailing edge, an injection opening disposed between the leading edge and the trailing edge, a suction opening disposed between the injection opening and the trailing edge, a channel extending from the injection opening to the suction opening, a first passageway, a second passageway, a first opening, a second opening, and a third opening, the first passageway extending from the first opening to the second opening, the first opening in communication with the channel and the second opening in communication with the second passageway, the second passageway in communication with the first passageway and extending to the third opening, the third opening in communication with a first environment exterior to the second passageway;
a heating member attached to the main body and sized and configured to heat fluid traveling through the second passageway, the heating member disposed between the leading edge and the second passageway; and
a fluid pressurizer disposed within the channel.

* * * * *